US011519160B2

(12) United States Patent
Wales et al.

(10) Patent No.: US 11,519,160 B2
(45) Date of Patent: Dec. 6, 2022

(54) METERED DISPENSE POT FILLER

(71) Applicant: Delta Faucet Company, Indianapolis, IN (US)

(72) Inventors: Joshua Wales, Indianapolis, IN (US); Robert W. Rodenbeck, Indianapolis, IN (US); Joel D. Sawaski, Indianapolis, IN (US); Anthony G. Spangler, Indianapolis, IN (US); Kent Rittenhouse, Holland, OH (US)

(73) Assignee: Delta Faucet Company, Indianapolis, IN (US)

( * ) Notice: Subject to any disclaimer, the term of this patent is extended or adjusted under 35 U.S.C. 154(b) by 0 days.

(21) Appl. No.: 17/097,556

(22) Filed: Nov. 13, 2020

(65) Prior Publication Data

US 2021/0062484 A1 Mar. 4, 2021

Related U.S. Application Data

(63) Continuation-in-part of application No. 16/571,893, filed on Sep. 16, 2019.

(Continued)

(51) Int. Cl.
*E03B 1/00* (2006.01)
*E03C 1/05* (2006.01)
(Continued)

(52) U.S. Cl.
CPC ............ *E03C 1/055* (2013.01); *E03C 1/0412* (2013.01); *G04B 19/16* (2013.01); *G05D 23/1353* (2013.01); *G05D 23/1393* (2013.01)

(58) Field of Classification Search
CPC .................. E03C 1/055; E03C 1/0412; E03C 2001/0414; G04B 19/16; G05D 23/1353
See application file for complete search history.

(56) References Cited

U.S. PATENT DOCUMENTS 7,150,293 B2 ‡ 12/2006 Jonte ....................... E03C 1/057
137/613
7,306,115 B2 ‡ 12/2007 Beachy ................. G01F 15/003
222/14

(Continued)

FOREIGN PATENT DOCUMENTS

CN 2048547 U 11/1989
CN 201090780 Y 7/2008

(Continued)

OTHER PUBLICATIONS

American Standard, Beale MeasureFill Touch Pull-Down Kitchen Faucet, retrieved on Dec. 29, 2019 from https://www.americanstandard-us.com/kitchens/kitchen-faucets/beale-measurefill-touch-kitchen-faucet-32964, 11 pages.‡

(Continued)

*Primary Examiner* — Reinaldo Sanchez-Medina
(74) *Attorney, Agent, or Firm* — Bose McKinney & Evans LLP

(57) ABSTRACT

A pot filler including a metered dispense input device for dispensing of predetermined volumes of water. The pot filler illustratively includes an electrically operable valve operably coupled to a metered dispense input unit, and a control module configured to control operation of the electrically operable valve.

23 Claims, 27 Drawing Sheets

Related U.S. Application Data

(60) Provisional application No. 62/732,486, filed on Sep. 17, 2018.

(51) Int. Cl.
    *E03C 1/04*           (2006.01)
    *G04B 19/16*       (2006.01)
    *G05D 23/13*       (2006.01)

(56) References Cited

U.S. PATENT DOCUMENTS

| | | | | |
|---|---|---|---|---|
| 7,458,520 | B2 ‡ | 12/2008 | Belz | G05D 23/1393 236/12.12 |
| 7,537,023 | B2 ‡ | 5/2009 | Marty | F16K 37/0041 137/554 |
| 7,690,395 | B2 ‡ | 4/2010 | Jonte | E03C 1/057 137/551 |
| 7,837,063 | B2 ‡ | 11/2010 | Stoddard | G01F 15/003 222/14 |
| 7,979,928 | B2 ‡ | 7/2011 | Allen, Jr | E03C 1/057 4/623 |
| 7,997,301 | B2 ‡ | 8/2011 | Marty | E03C 1/057 239/443 |
| 8,127,967 | B1 ‡ | 3/2012 | Beachy | G01F 15/005 222/14 |
| 8,403,179 | B1 ‡ | 3/2013 | Gerber | B67D 1/0036 251/63 |
| 8,820,705 | B2 | 9/2014 | Davidson et al. | |
| RE45,373 | E ‡ | 2/2015 | Allen, Jr | E03C 1/057 4/623 |
| 8,950,730 | B2 ‡ | 2/2015 | Bedolla | G05B 15/02 137/606 |
| 9,009,883 | B2 * | 4/2015 | Chase | E03C 1/055 4/626 |
| 9,139,987 | B2 ‡ | 9/2015 | Bedolla | G05D 7/0617 |
| 9,285,807 | B2 ‡ | 3/2016 | Rodenbeck | E03C 1/057 |
| 9,458,612 | B2 ‡ | 10/2016 | Thomas | F16K 31/082 |
| 9,528,249 | B2 ‡ | 12/2016 | Gompper | E03C 1/04 |
| 9,777,470 | B2 | 10/2017 | Mazz et al. | |
| 9,816,257 | B2 ‡ | 11/2017 | Blake et al. | |
| 9,840,832 | B2 ‡ | 12/2017 | Seggio et al. | |
| 9,945,103 | B2 ‡ | 4/2018 | Thompson et al. | |
| 10,184,232 | B2 | 1/2019 | Veros et al. | |
| 2002/0167861 | A1 ‡ | 11/2002 | Barton | A47J 43/082 366/601 |
| 2005/0235981 | A1 * | 10/2005 | Mac | F24C 15/10 126/39 R |
| 2007/0152074 | A1 ‡ | 7/2007 | Stowe | E03C 1/055 236/12.1 |
| 2007/0246550 | A1 * | 10/2007 | Rodenbeck | G05D 23/1353 236/12.11 |
| 2008/0277927 | A1 * | 11/2008 | Mueller | E03C 1/0404 285/272 |
| 2010/0101018 | A1 * | 4/2010 | Chase | E03C 1/055 4/653 |
| 2013/0014844 | A1 | 1/2013 | Davidson et al. | |
| 2014/0345726 | A1 ‡ | 11/2014 | Seggio | E03C 1/057 137/613 |
| 2014/0359935 | A1 | 12/2014 | Veros et al. | |
| 2015/0322652 | A1 | 11/2015 | Mazz et al. | |
| 2016/0214041 | A1 ‡ | 7/2016 | Miller | B01D 35/04 |
| 2016/0289932 | A1 ‡ | 10/2016 | Mirakhimov | E03C 1/0401 |
| 2016/0362877 | A1 ‡ | 12/2016 | Thomas | E03C 1/0404 |
| 2017/0068257 | A1 ‡ | 3/2017 | Quinones | G01F 25/0092 |
| 2017/0101766 | A1 ‡ | 4/2017 | Blizzard | F16K 21/16 |
| 2017/0121952 | A1 ‡ | 5/2017 | Hong | G01F 15/003 |
| 2017/0219115 | A1 ‡ | 8/2017 | Hong | E03C 1/0412 |
| 2017/0260722 | A1 ‡ | 9/2017 | Horwitz | G01F 15/06 |
| 2018/0355592 | A1 * | 12/2018 | Mandel | G01F 1/661 |
| 2019/0264427 | A1 * | 8/2019 | Chung | E03C 1/055 |
| 2020/0089262 | A1 | 3/2020 | Wales et al. | |

FOREIGN PATENT DOCUMENTS

| | | | | |
|---|---|---|---|---|
| CN | 201090780 Y | ‡ | 7/2008 | |
| CN | 102844501 A | | 12/2012 | |
| CN | 102844501 A | ‡ | 12/2012 | E03C 1/057 |
| CN | 204756129 U | | 11/2015 | |
| CN | 204756129 U | ‡ | 11/2015 | |
| CN | 105782551 A | ‡ | 7/2016 | |
| CN | 105782551 A | | 7/2016 | |
| CN | 107269917 A | ‡ | 10/2017 | E03C 1/0404 |
| CN | 107269917 A | | 10/2017 | |
| JP | 2007085525 A | | 4/2007 | |
| WO | 2007082301 | | 7/2007 | |
| WO | WO 2007/082301 | ‡ | 7/2007 | |
| WO | 2008094651 | | 8/2008 | |
| WO | WO 2008/094651 | ‡ | 8/2008 | |
| WO | 2009075858 | | 6/2009 | |
| WO | WO 2009/075858 | ‡ | 6/2009 | |

OTHER PUBLICATIONS

American Standard, specsheet 4931360, © 2017 AS America Inc., 2 pages.‡

\* cited by examiner
‡ imported from a related application

METERED DISPENSE POT FILLER

CROSS-REFERENCE TO RELATED APPLICATION

This application is a continuation-in-part of U.S. application Ser. No. 16/571,893, filed Sep. 16, 2019, which claims the benefit of U.S. Provisional Application Ser. No. 62/732,486, filed on Sep. 17, 2018, the disclosures of which are expressly incorporated herein by reference.

BACKGROUND AND SUMMARY OF THE DISCLOSURE

The present disclosure relates generally to a fluid delivery apparatus and, more particularly, to a faucet including a metered dispense input device.

Electronic faucets typically include an electrically operable valve coupled to an electronic controller for controlling fluid flow through a water outlet. Some electronic faucets include proximity sensors, such as active infrared ("IR") proximity detectors or capacitive proximity sensors to control operation of the electrically operable valve. Such proximity sensors may be used to detect a user's hands positioned near the faucet and to automatically start fluid flow through the faucet in response to detection of the user's hands. Other electronic faucets may use touch sensors, such as capacitive touch sensors, to control the faucet. An illustrative electronic faucet is detailed in U.S. Patent Application Publication No. 2016/0362877 to Thomas et al., the disclosure of which is expressly incorporated herein by reference.

The present disclosure relates to a metered dispense pot filler which includes a metered dispense input device that is integrated into the metered dispense pot filler to allow the dispensing of precise volumes of water. The present disclosure further relates to a metered dispense pot filler which includes an electrically operable valve operably coupled to a metered dispense input unit and a control module in communication with the input controller and configured to control operation of the electrically operable valve.

According to an illustrative embodiment of the present disclosure, a metered dispense pot filler mounted on a wall having a fluid supply for use in dispensing fluid into cooking utensils resting on a cooking surface, the pot filler includes a metered dispense input device in fluid communication with the fluid supply, a first arm having a first and second end, the first end rotatably coupled to and extending radially of the metered dispense input device a second arm having a first and second end, the first end rotatably coupled to and extending radially of the second end of the first arm, and a fluid outlet, in fluid communication with the fluid supply and mounted to the second end of the second arm, wherein the metered dispense input device includes a shell defining a chamber, an input controller disposed within the chamber and operably coupled with an electrically operable valve of the fluid supply, a rotatable first dial supported by the shell and operably coupled to the input controller, a rotatable second dial supported by the shell and operably coupled to the input controller, and an activation button positioned above the first dial and in communication with the input controller, the activation button operably coupled to the first dial and the second dial.

According to another illustrative embodiment of the present disclosure, a metered dispense pot filler mounted on a wall having a fluid supply for use in dispensing fluid into cooking utensils resting on a cooking surface, the pot filler includes a metered dispense input device in fluid communication with the fluid supply, a first arm having a first and second end, the first end rotatably coupled to and extending radially of the metered dispense input device, a second arm having a first and second end, the first end rotatably coupled to and extending radially of the second end of the first arm, and a fluid outlet, in fluid communication with the fluid supply and mounted to the second end of the second arm, wherein the metered dispense input unit includes a shell defining a chamber, an input controller disposed within the chamber and configured to communicate with an electrically operable valve, a rotatable first dial supported by the shell and operably coupled to the input controller, a rotatable second dial supported by the shell and operably coupled to the input controller, an activation button positioned above the first dial, the activation button operably coupled to the input controller, an electrically operable valve operably coupled to the metered dispense input unit, and a control module in communication with the input controller and configured to control operation of the electrically operable valve.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF DRAWINGS

A detailed description of the drawings particularly refers to the accompanying figures, in which.

DETAILED DESCRIPTION OF THE DRAWINGS

Figure 1:
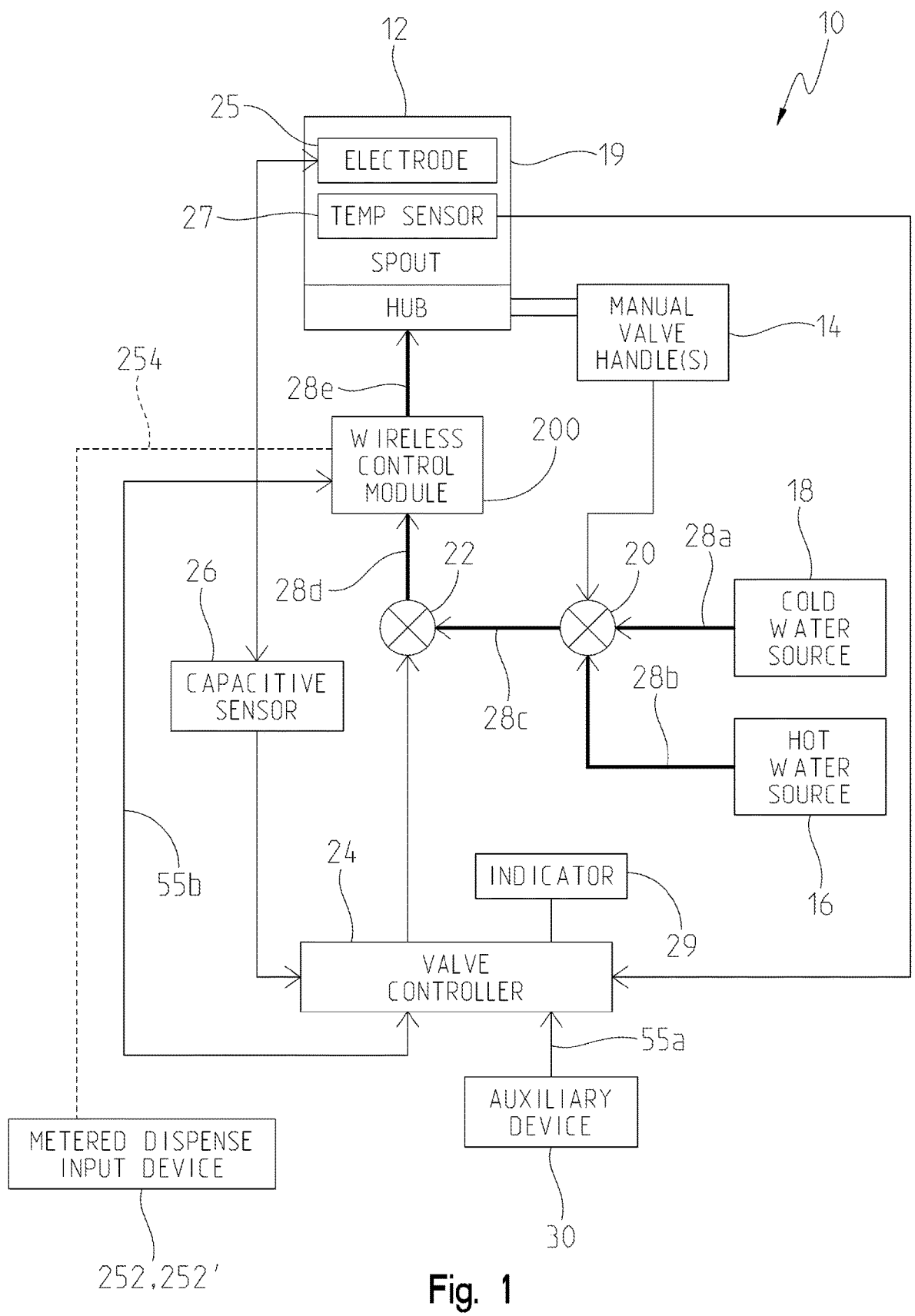
FIG. 1 is a block diagram illustrating an exemplary electronic faucet of the present disclosure.

For the purposes of promoting an understanding of the principles of the present disclosure, reference will now be made to the embodiments illustrated in the drawings, which are described herein. The embodiments disclosed herein are not intended to be exhaustive or to limit the invention to the precise form disclosed. Rather, the embodiments are chosen and described so that others skilled in the art may utilize their teachings. Therefore, no limitation of the scope of the claimed invention is thereby intended. The present invention includes any alterations and further modifications of the illustrated devices and described methods and further applications of principles in the invention which would normally occur to one skilled in the art to which the invention relates.

The present disclosure relates to a metered dispense input device that communicates with a control module of an electronic faucet to allow control of the faucet such that precise volumes of water can be dispensed. In an illustrative embodiment, the metered dispense input device wirelessly communicates with the control module to dispense water from the faucet. In another illustrative embodiment, the metered dispense input device is integrated into the faucet.

Referring initially to FIG. 1, a block diagram of an electronic faucet 10 is shown according to some illustrative embodiments of the present disclosure. The electronic faucet 10 includes a spout 12 supporting a passageway or fluid conduit for delivering fluids such as water, for example. The passageway of the spout 12 may include fluid passages 28 between a hot water source 16, a cold water source 18, and a water outlet 19 of the spout 12. See, for example, passages 28a, 28b, 28c, 28d, 28e of FIG. 1, which may comprise flexible tubes made of a polymer (e.g., cross-linked polyethylene (PEX)).

The electronic faucet 10 illustratively includes an electrically operable valve, such as a solenoid valve 22, in fluid communication with the hot water source 16 and the cold water source 18. The solenoid valve 22 is illustratively controlled electronically by a valve controller 24. In an illustrative embodiment, the valve controller 24 is configured to open and close the solenoid valve 22 to turn on and off the fluid flow to the outlet 19 of the spout 12. In another illustrative embodiment, the valve controller 24 may be further configured to proportionally control the solenoid valve 22 to adjust the flow rate and/or temperature of the fluid flowing through the spout 12. In an illustrative embodiment, the solenoid valve 22 may comprise a pilot operated solenoid valve, although another suitable electrically operable or actuator driven valves may be provided, such as an electronically proportional valve (EPV). Additional details of the solenoid valve 22 is further provided in U.S. Pat. No. 9,458,612, the disclosure of which is expressly incorporated herein by reference.

The illustrative valve controller 24 may control the solenoid valve 22 based on output from at least one activation sensor, such as a proximity sensor and/or a touch sensor, for example. The activation sensor may comprise a capacitive sensor 26 in communication with the valve controller 24 for providing signals to the valve controller 24 indicating the detection of an object, such as a user's hands, on or near spout 12. Other suitable activation sensors may be utilized, such as infrared (IR) sensors, manual toggle switches, push buttons, etc.

As illustrated in FIG. 1, an electrode 25 of the capacitive sensor 26 is coupled to the spout 12 to detect an object contacting the spout 12. The electrode 25 may be positioned elsewhere on faucet 10 for detecting the presence of a user's hands. The capacitive sensor 26 and the electrode 25 may be utilized for either a touch mode of operation, a hands-free mode of operation, or a combined touch and hands-free mode of operation. In the hands-free mode of operation, the capacitive sensor 26 and the valve controller 24 detect a user's hands or other object within a detection area or zone near the spout 12. In one embodiment, the detection area includes the water stream discharged from the outlet 19 and the area in the sink basin immediately surrounding the water stream. The detection area may be expanded to other areas depending on the location and sensitivity of the capacitive sensor 26. In the touch mode of operation, the capacitive sensor 26 and the valve controller 24 detect a user's hands or other object upon contact with a surface of the spout 12 (or other designated component of the faucet 10). To turn on the faucet 10 in either mode, the solenoid valve 22 is activated by the valve controller 24 upon detecting the object (e.g., the user's hands) to toggle water flow on and off.

In some illustrative embodiments, by sensing capacitance changes with the capacitive sensor 26, the valve controller 24 is configured to make logical decisions to control different modes of operation of the faucet 10 such as changing between a manual mode of operation and a hands free mode of operation as described in U.S. Pat. Nos. 7,537,023; 7,690,395; 7,150,293; 7,997,301; and PCT International Patent Application Publication Nos. WO 2008/094651 and WO 2009/075858, the disclosures of which are all expressly incorporated herein by reference.

Still referring to FIG. 1, in one illustrative embodiment, the water temperature and the water flow rate may be manipulated by manual adjustment of a manual valve handle 14 operably coupled to a manual valve assembly 20. As the manual valve handle 14 is adjusted, the manual valve assembly 20 positioned in the passageway of the spout 12 may correspondingly adjust the temperature and/or flow of fluid from the hot water source 16 and the cold water source 18 to the solenoid valve 22. A separate manual valve handle 14 may be provided for each of the hot water source 16 and the cold water source 18. In other illustrative embodiments, the electronic faucet 10 is a fully automatic faucet without the manual valve handle(s) 14 or the manual valve assembly 20. An illustrative manual valve assembly 20 is detailed in U.S. Pat. No. 7,753,074, the disclosure of which is expressly incorporated herein by reference.

The valve controller 24 may further control the valve assembly 20 electronically. For example, the valve assembly 20 may comprise an electrically operable valve, such as an electronic proportioning or mixing valve, that is adjusted by the valve controller 24 to control the mixture of hot and cold water and thus the temperature of the water flowing through the spout 12 to the outlet 19. Such an electronic mixing valve 20 may be in addition to, or replace, the solenoid valve 22. Additionally, the mixing valve 20 may be replaced by separate hot and cold water proportional valves. Exemplary electronically controlled mixing valves are described in U.S. Pat. No. 7,458,520 and PCT International Patent Application Publication No. WO 2007/082301, the disclosures of which are expressly incorporated herein by reference.

The amount of fluid flowing from the hot water source 16 and the cold water source 18 may be controlled by the valve controller 24 based on one or more user inputs, such as desired water temperature, desired water flow rate, desired water volume, various task based inputs, various recognized presentments, and/or combinations thereof. For example, the faucet 10 may include a temperature sensor 27 in fluid communication with the water output of the electrically operable valve 22, and thereby the water discharged from the outlet 19 of the spout 12, to provide feedback to valve controller 24 for use in controlling the water temperature. In one illustrative embodiment, the valve controller 24 controls the electrically operable valve 22 via an auxiliary port (not shown).

The temperature sensor 27 can be used to provide water at a desired temperature, or may be utilized to implement additional features of an exemplary faucet. For example, the temperature sensor 27 and the valve controller 24 may define a high temperature limit and/or a "warm-up" feature. The temperature sensor 27 illustratively provides a signal to the valve controller 24 corresponding with the temperature of the water as it flows over the temperature sensor 27. The valve controller 24 may compare feedback to the settings of the electronic faucet 10 to ensure that the water temperature does not exceed a maximum setting or to ensure the water is preheated for use, for example. In both circumstances, when a desired water temperature is reached, the valve controller 24 may turn off or close the electrically operable valve 22.

The faucet 10 may include one or more indicators 29 controlled by the valve controller 24 to provide a visual or audio indication of the operational mode (e.g., hands free and/or touch mode) and/or water temperature of the electronic faucet 10. An exemplary indicator 29 includes a light-emitting diode (LED) or other light source, or audible device positioned near the faucet 10. Other exemplary indicators 29 include a liquid crystal display (LCD) and a magnetically latching mechanical indicator. In one embodiment, the indicators 29 are operative to indicate operating mode and/or the temperature of the water flowing through the faucet 10 based on the selective illumination of different colored LED's or a single multi-colored LED. The indicator 29 may provide a color indication of water temperature (e.g., cold water represented by a blue light, and hot water represented by a red light).

The valve controller 24 may be in communication with a remote device in addition to the electronic faucet 10, illustratively an auxiliary device 30. The exemplary auxiliary device 30 may include, for example, another faucet spout, a soap dispenser, a beverage dispenser, or another suitable dispensing device. The auxiliary device 30 may be positioned adjacent the same sink basin as the spout 12. Alternatively, the auxiliary device 30 may be positioned to dispense into a different sink basin, such as another sink basin in a bathroom or kitchen or in another room, for example. The auxiliary device 30 may also comprise any of a garbage disposal, a dishwasher, an instant hot device, a remote switch (e.g., a foot switch), or other device associated with or in proximity to a plumbing device. In another illustrative embodiment, the auxiliary device 30 may alternately or additionally comprise a wireless control module 200.

While the illustrative auxiliary device 30 may be fully controlled by valve controller 24, the device 30 may also include a separate controller (e.g., microprocessor) for operating itself, while receiving power and/or communication from the controller 24.

Figure 7:
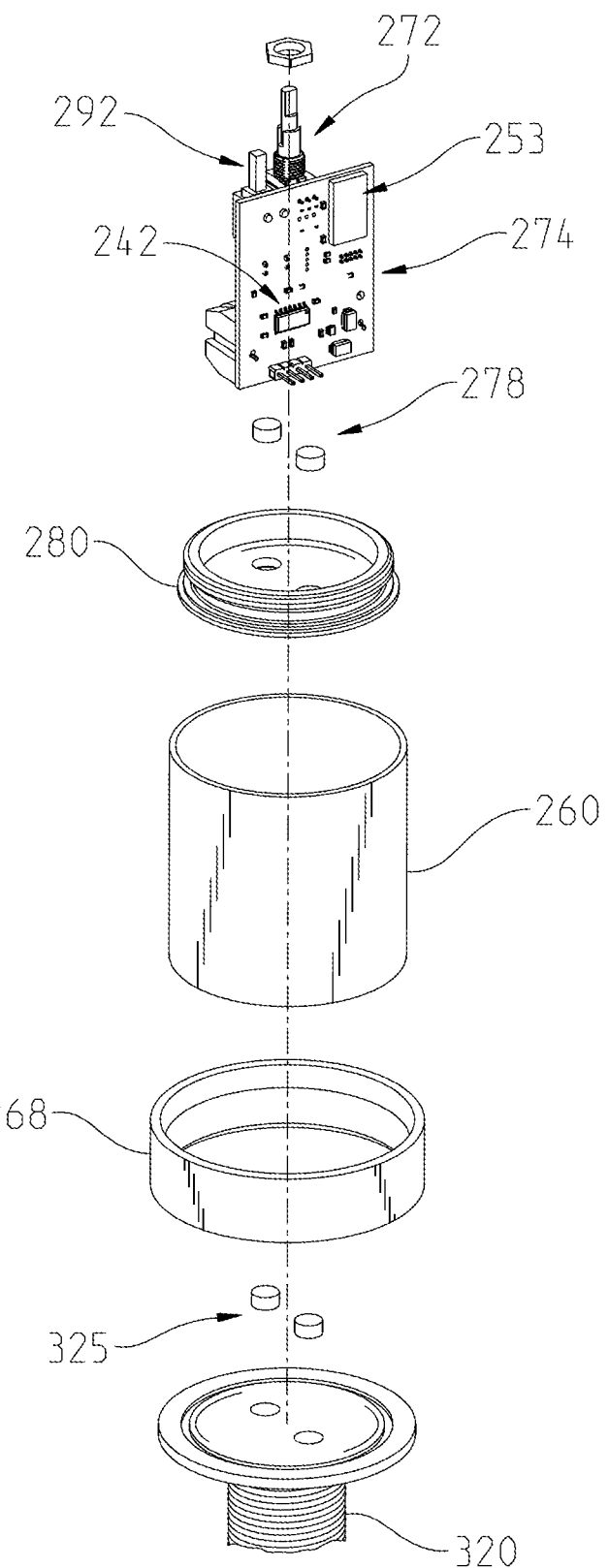
FIG. 7 is an exploded perspective view of a lower portion of the metered dispense input device shown in FIG. 6.
Figure 8:
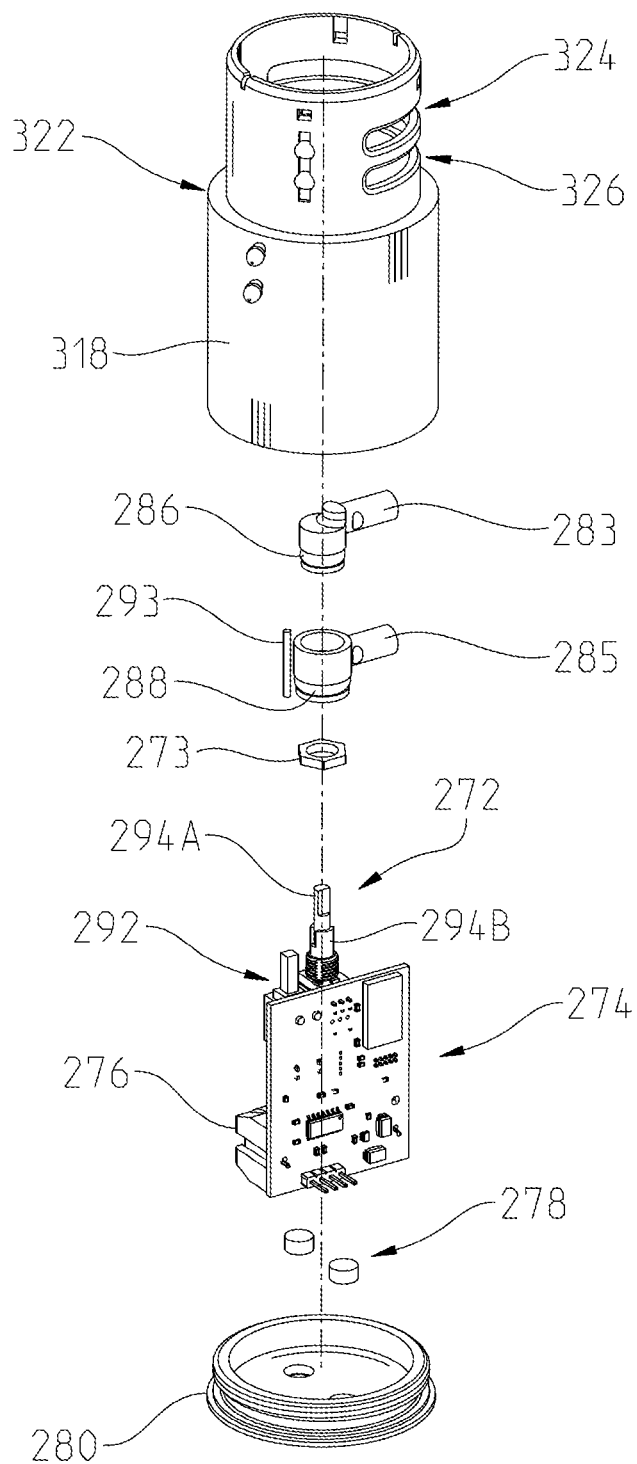
FIG. 8 is an exploded perspective view of a middle portion of the metered dispense input device shown in FIG. 6.
Figure 9:
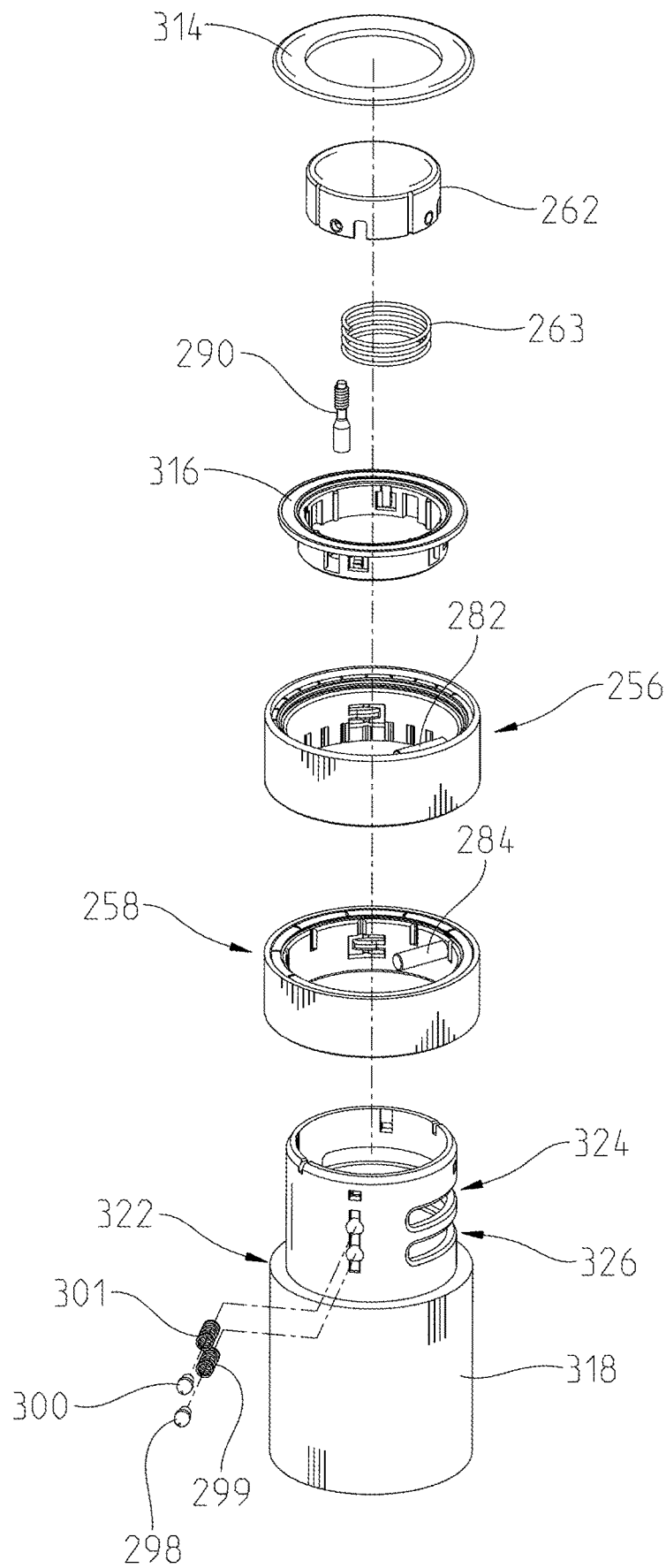
FIG. 9 is an exploded perspective view of an upper portion of the metered dispense input device of FIG. 2.

As shown in FIG. 1, a metered dispense input device 252 is illustratively in communication with the wireless control module 200. Illustratively, a wireless transceiver 253 of the metered dispense input device 252 (FIG. 7) is in wireless communication with a wireless transceiver 250 of the wireless control module 200 (FIG. 16B). In one illustrative embodiment, a wireless connection 254 between the metered dispense input device 252 and the wireless control module 200 is a Bluetooth or radio frequency (RF) connection. In another embodiment, the connection 254 is a Wi-Fi connection. However, it is within the scope of the present disclosure that alternate forms of wireless connection may be used, such as near field communication (NFC), for example. In other illustrative embodiments, a wired connection may be used between the metered dispense input device 252 and the control module 200 (or directly between the metered dispense input device 252 and the valve controller 24) such that the metered dispense input device 252 may be integrated within the electronic faucet 10. For example, the metered dispense input device 252 may comprise an auxiliary device 30 in direct communication within the valve controller 24. It should be further noted that in certain illustrative embodiments, the valve controller 24 and the wireless control module 200 may be defined by a single controller.

Referring now to FIGS. 2-14, the illustrative metered dispense input device 252 is shown in greater detail. The illustrative metered dispense input device 252 includes an activation button 262, a top shell 314, a serving quantity dial 256, a measurement units dial 258, and an outer shell 260 to house the internal components of metered dispense input device 252 further discussed herein. As further detailed herein, the rotational position of the serving quantity dial 256 selects one of a plurality of values corresponding with a numerical value or unit. The rotational position of the measurement units dial 258 selects one of a plurality of values corresponding with a fluid serving size.

Figure 5:
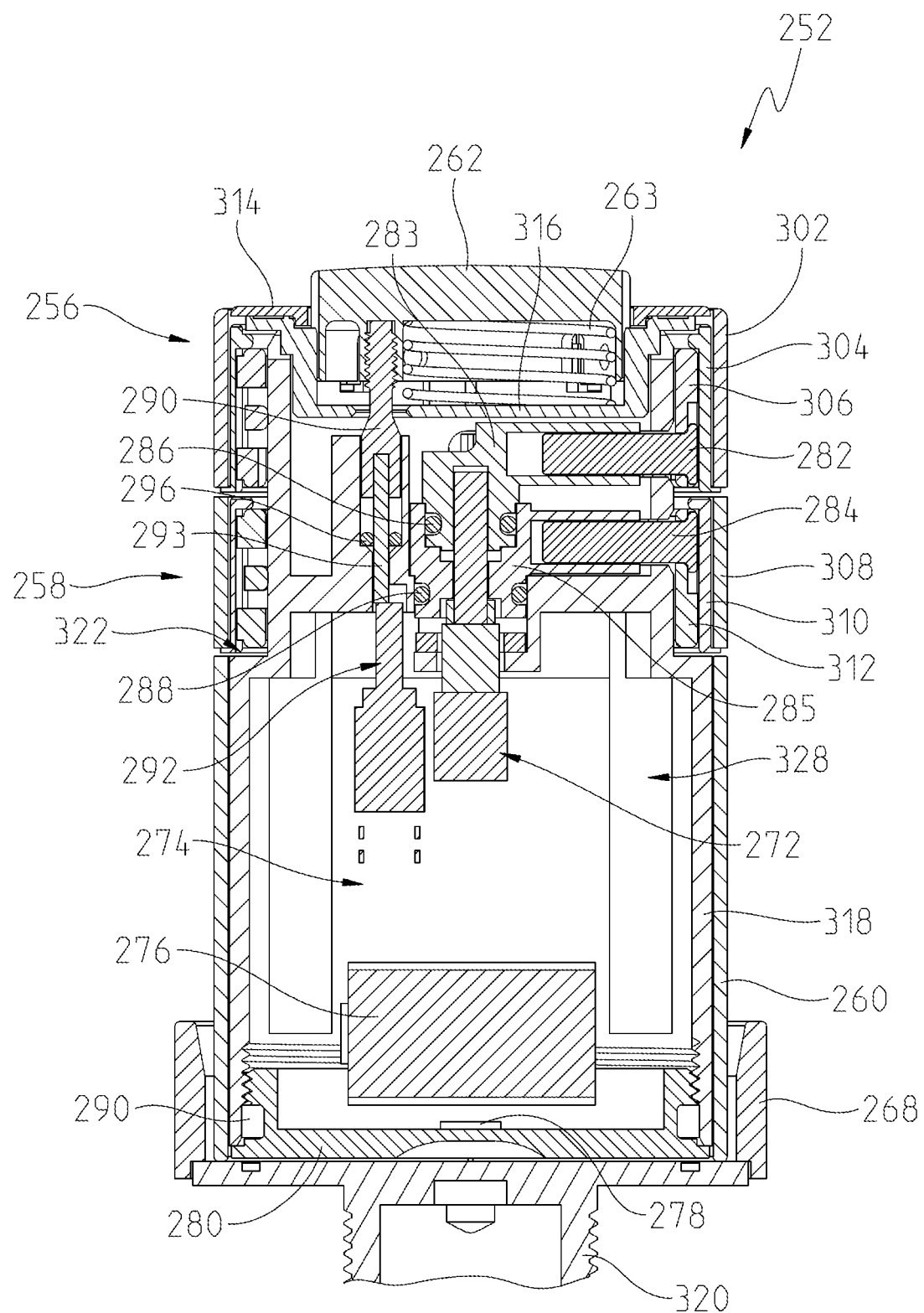
FIG. 5 is another cross-sectional view of the metered dispense input device of FIG. 2.

The activation button 262 illustratively stands proud of the top shell 314 in a raised position, and sits in a seat 316 (FIG. 3) positioned underneath the top shell 314. The illustrative activation button 262 is also spring loaded in the seat 316 such that when activation button 262 is depressed, a spring 263 biases the activation button 262 to its original or raised position. Further, when activation button 262 is actuated (e.g., by pressing), the metered dispense input device 252 is activated via a button switch 292 (FIG. 5).

Figure 3:
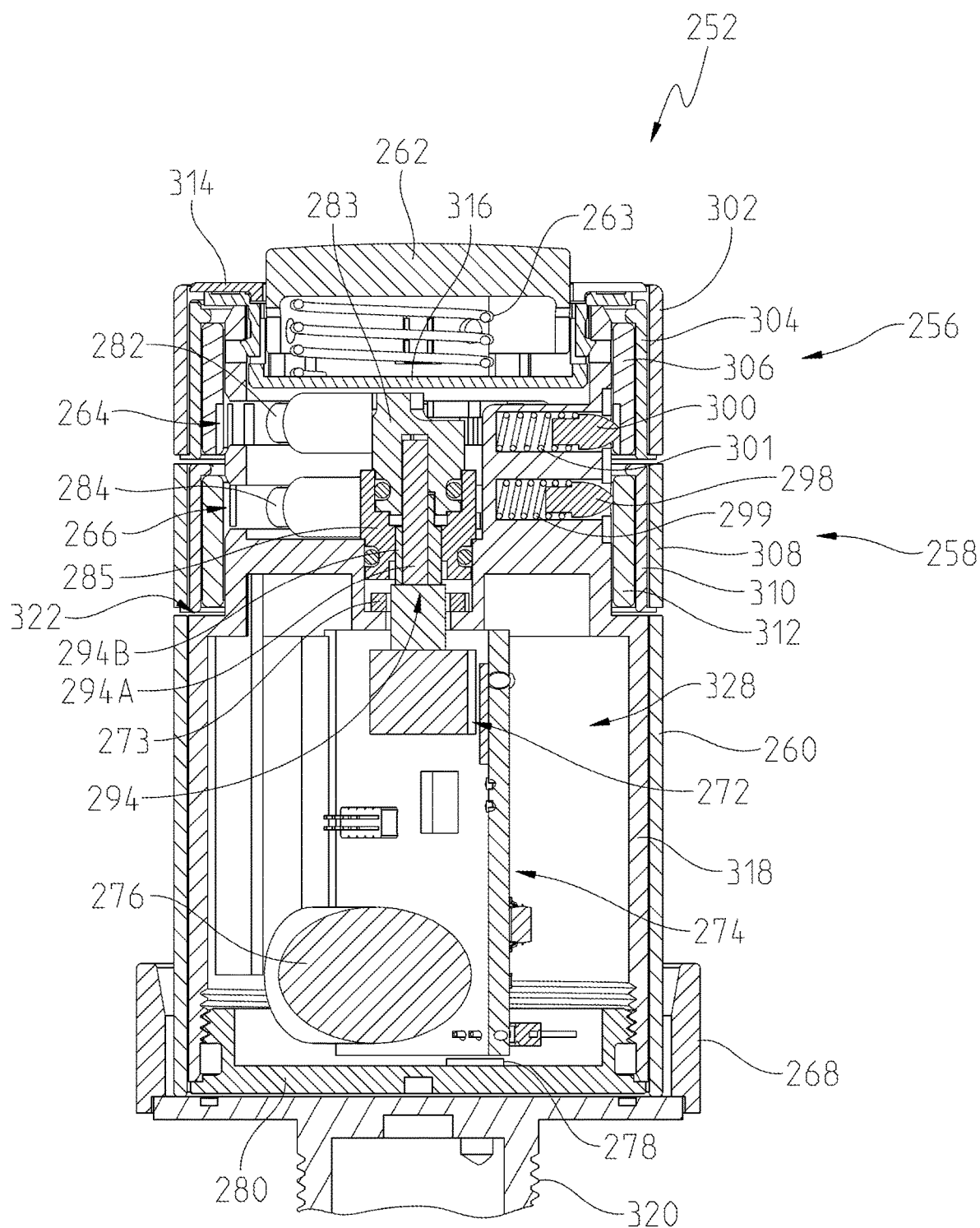
FIG. 3 is a cross-sectional view of the metered dispense input device of FIG. 2.

In an illustrative embodiment, when the activation button 262 is actuated (e.g., by pressing), the button switch 292 activates the circuitry (e.g., via communication with a power supply 276) of an input controller, illustratively a circuit card 274 (FIG. 3). A rotary sensor (e.g., a potentiometer 272) is operably coupled to a processor 242, such as a conventional microprocessor, of the circuit card 274 (FIG. 7), thereby providing information on the rotational position of the dials 256 and 258 between the metered dispense input device 252 and the faucet 10, for example, via the wireless transceiver 253 and the wireless control module 200 (FIG. 16B). In another illustrative embodiment, the activation button 262 may be activated by other input devices, such as a capacitive sensor detecting a user's touch rather than requiring depressing of the activation button 262. Further, after a period of inactivity for the metered dispense input device 252, the button switch 292 may deactivate or electrically decouple the power supply 276 of the circuit card 274 (i.e., from the potentiometer 272), such that there is no power draw into metered dispense input device 252 while the metered dispense input device 252 is nonoperational, thereby disconnecting the metered dispense input device 252 and the faucet 10. In another illustrative embodiment, the processor 242 on the circuit card 274 may enter into a sleep mode to reduce power consumption from the power supply 276.

The linkage 284 corresponds, and is operably coupled, with a quantity dial 256, and the linkage 282 corresponds with the units dial 258. The quantity dial 256 cooperates with the units dial 258 to control the quantity of liquid dispensed from the electronic faucet 10. Illustratively, the quantity dial 256 and the units dial 258 are rotatable around the circumference of the metered dispense input device 252 and utilize a detent mechanism described further herein to enable user selection of a discrete amount of liquid to be dispensed by the electronic faucet 10 in response to input from the metered dispense input device 252. The quantity dial 256 and the units dial 258 are illustratively vertically spaced from each other, and are supported for rotation about a common longitudinal axis 319 defined by the shell 318.

Specifically, the quantity dial 256 allows the user to select a discrete denomination of the liquid to be dispensed (e.g., ¼, ½, 1, 2, 3, etc.), and the units dial 258 allows the user to select the serving size of the liquid to be dispensed (e.g., cups, tablespoons, gallons, liters, etc.). For example, if a user selects a "3" on the quantity dial 256 and "tablespoons" on the units dial 258, then metered dispense input device 252 would communicate with the electronic faucet 10 such that the electronic faucet 10 dispenses three tablespoons of liquid upon actuation of the activation button 262. In one embodiment, the units dial 258 of the metered dispense input device 252 allows for at least six different units to be selectable such as tablespoons, ounces, cups, pints, quarts, and gallons. In another embodiment, a metric version of the units dial 258 could also be used. In yet another embodiment, the quantity dial 256 has quantities of ¼, ⅓, ½, ⅔, ¾, 1, 2, 3, 4, 5, 6, 7, and 8. However, it is within the scope of the present disclosure that alternate quantities and units may be used.

Figure 2A:
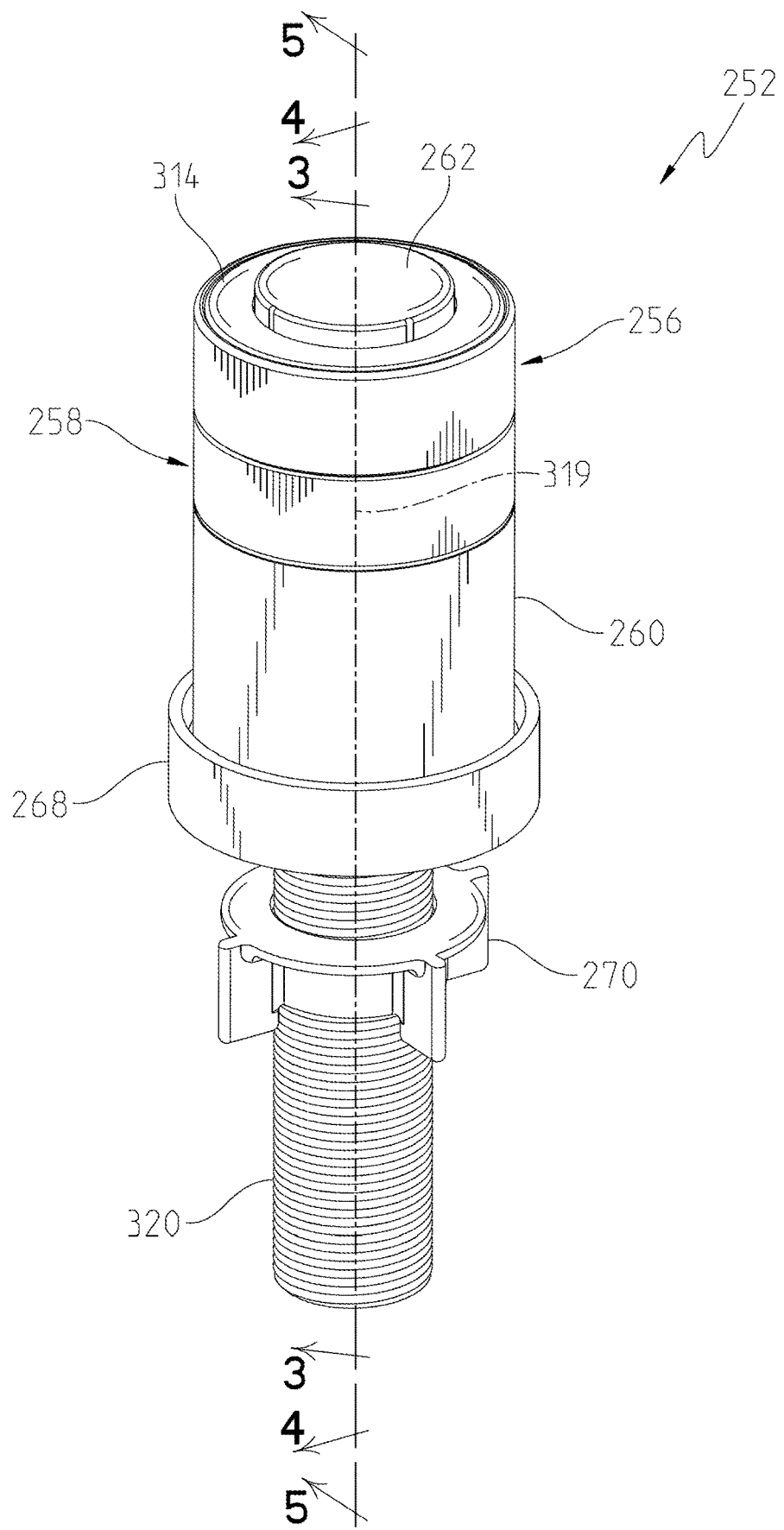
FIG. 2A is a perspective view of a metered dispense input device for use with the exemplary electronic faucet of FIG. 1 in accordance with the present disclosure.
Figure 2B:
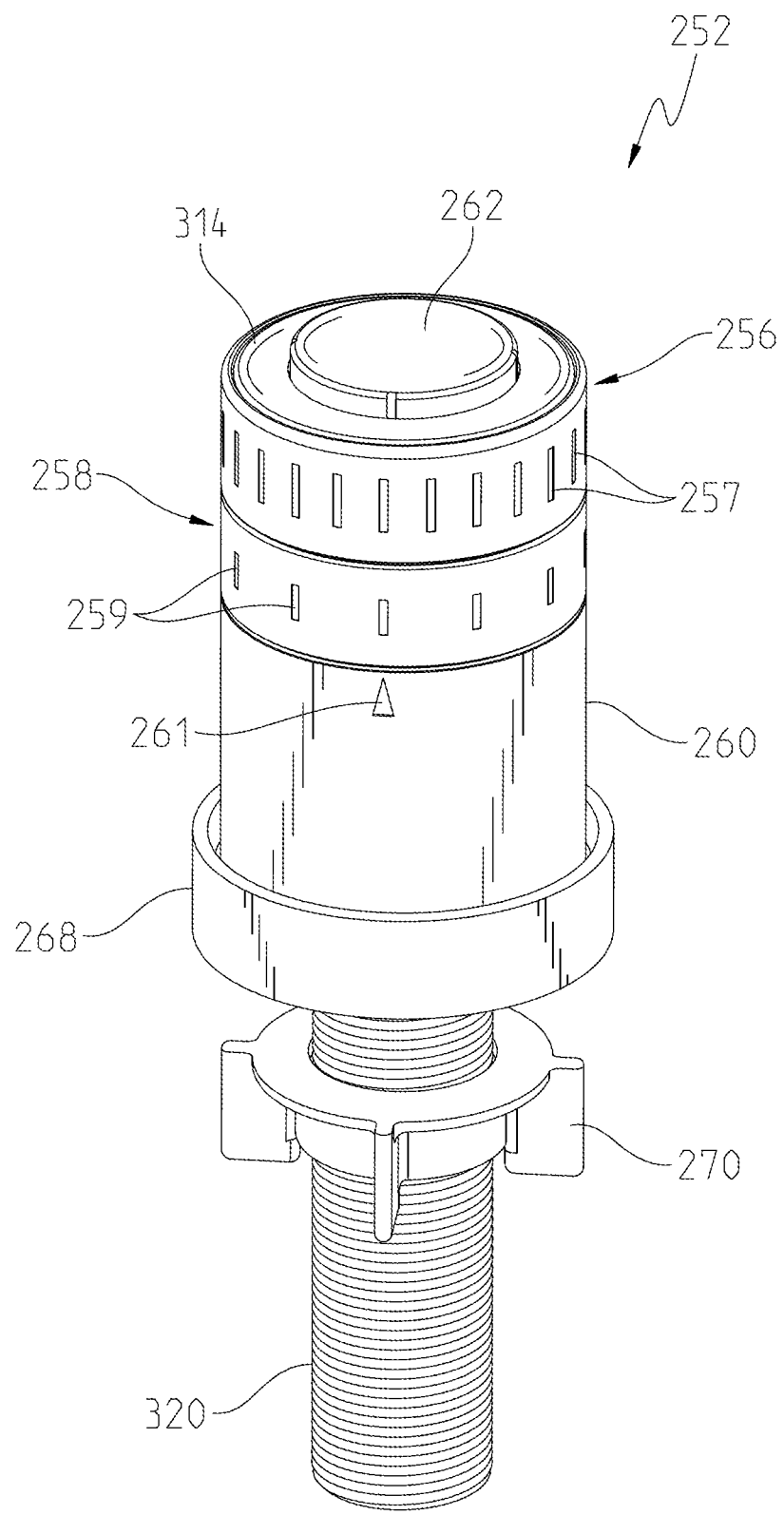
FIG. 2B is a perspective view of a metered dispense input device for use with the exemplary electronic faucet of FIG. 1 in accordance with the present disclosure, wherein the metered dispense input device further includes indicator markings.
Figure 2C:
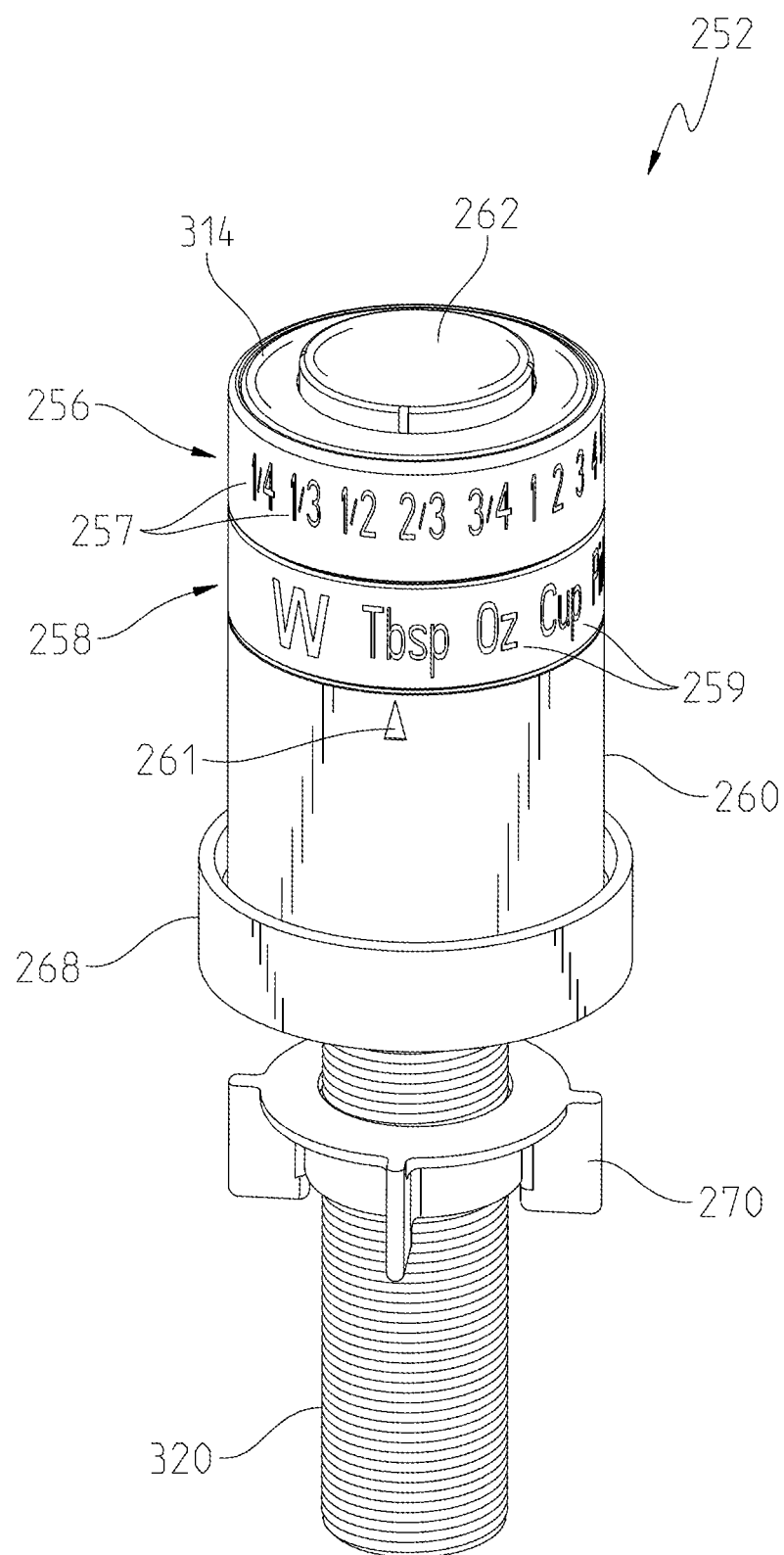
FIG. 2C is first perspective view of a further illustrative metered dispense input device similar to FIG. 2B, showing indicator markings as indicia representing serving units and quantities.
Figure 2D:
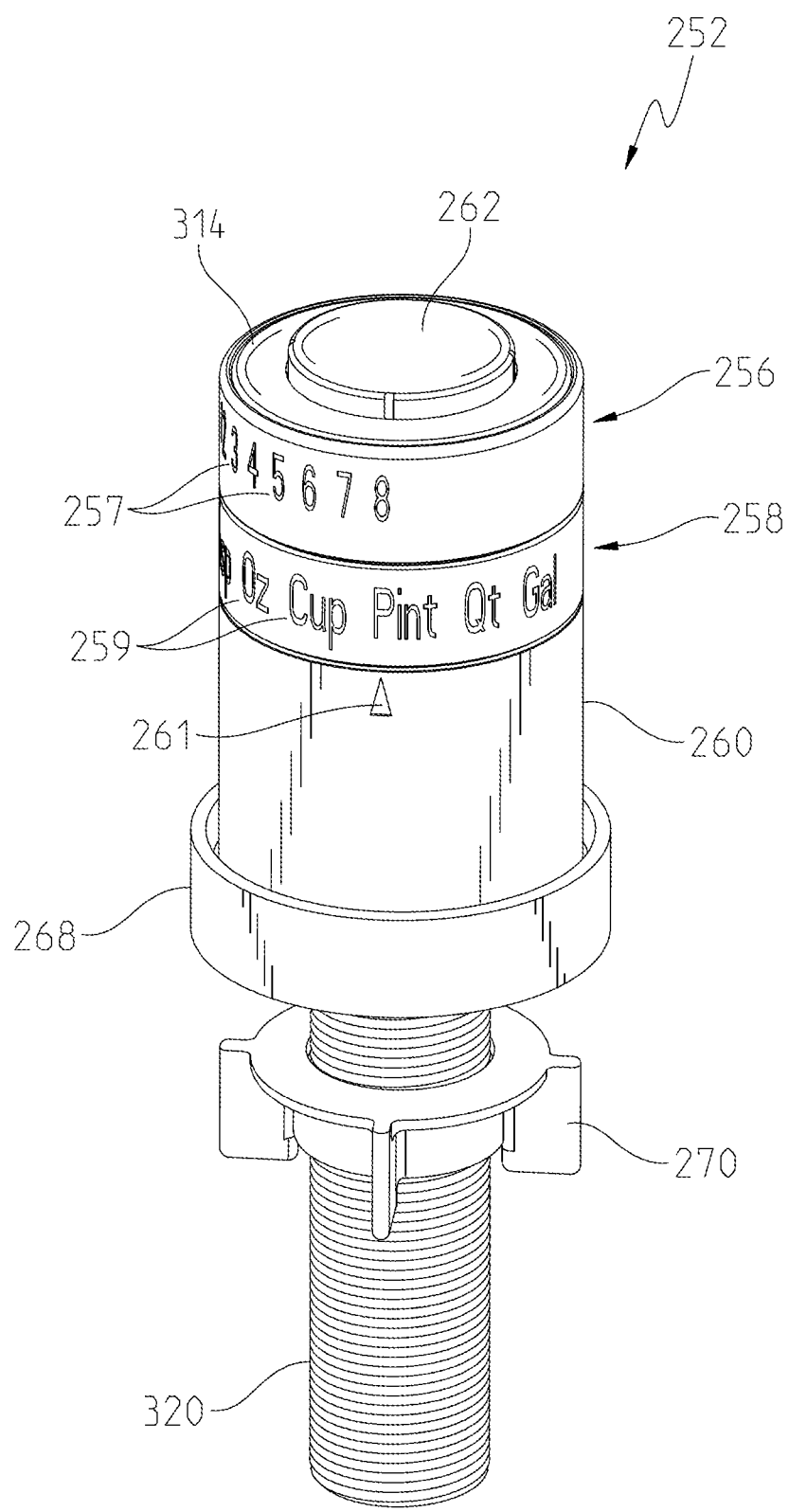
FIG. 2D is a second perspective view of the illustrative metered dispense input device of FIG. 2C, showing the input dials rotated clockwise.

As shown in FIG. 2B, markings 257 and 259 may be present on the outer surface of each of the quantity dial 256 and the units dial 258, respectively, to facilitate selection of a particular unit and/or quantity of measurement by the user. An indicator, such as an arrow 261, may be supported by the outer shell 260 for aligning the markings 257 and 259 as the dials 256 and 258 are rotated into a desired position. With reference to FIGS. 2C and 2D, illustrative markings on the quantity dial 256 include numerical units of ¼, ⅓, ½, ⅔, ¾, 1, 2, 3, 4, 5, 6, 7 and 8. while illustrative markings on the units dial 258 include W, Tbsp, Oz, Cup, Pint, Qt and Gal. Marking W represents a warm-up function as further detailed herein, while Tbsp, Oz, Cup, Pint, Qt and Gal represents liquid serving sizes of tablespoon, ounce, cup, pint, quart and gallon, respectively.

Figure 10:
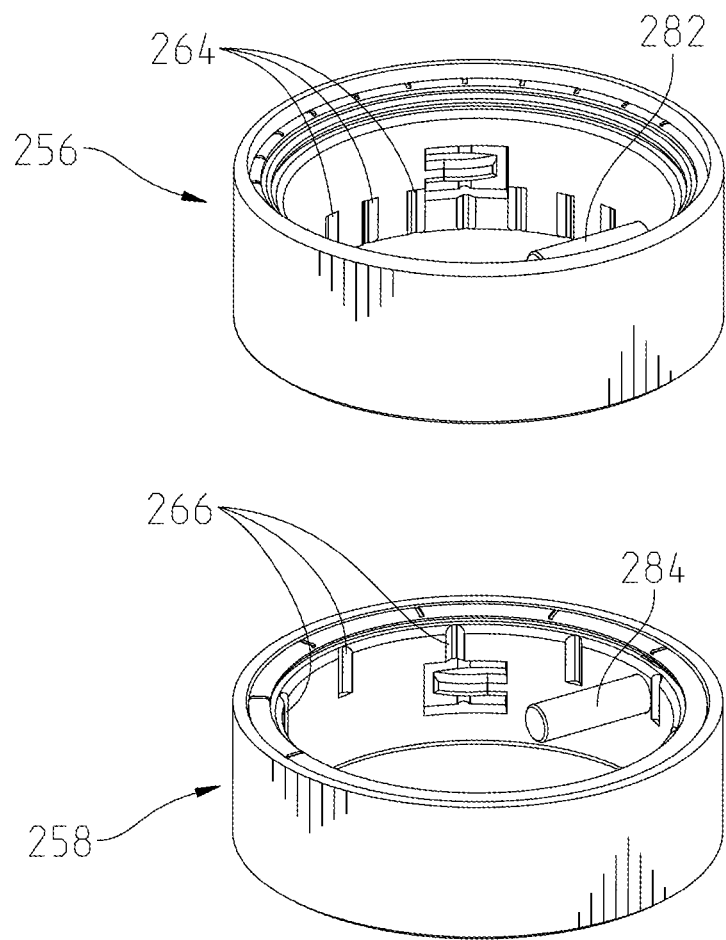
FIG. 10 is a perspective view of dials used in the metered dispense input device of FIG. 2.
Figure 11:
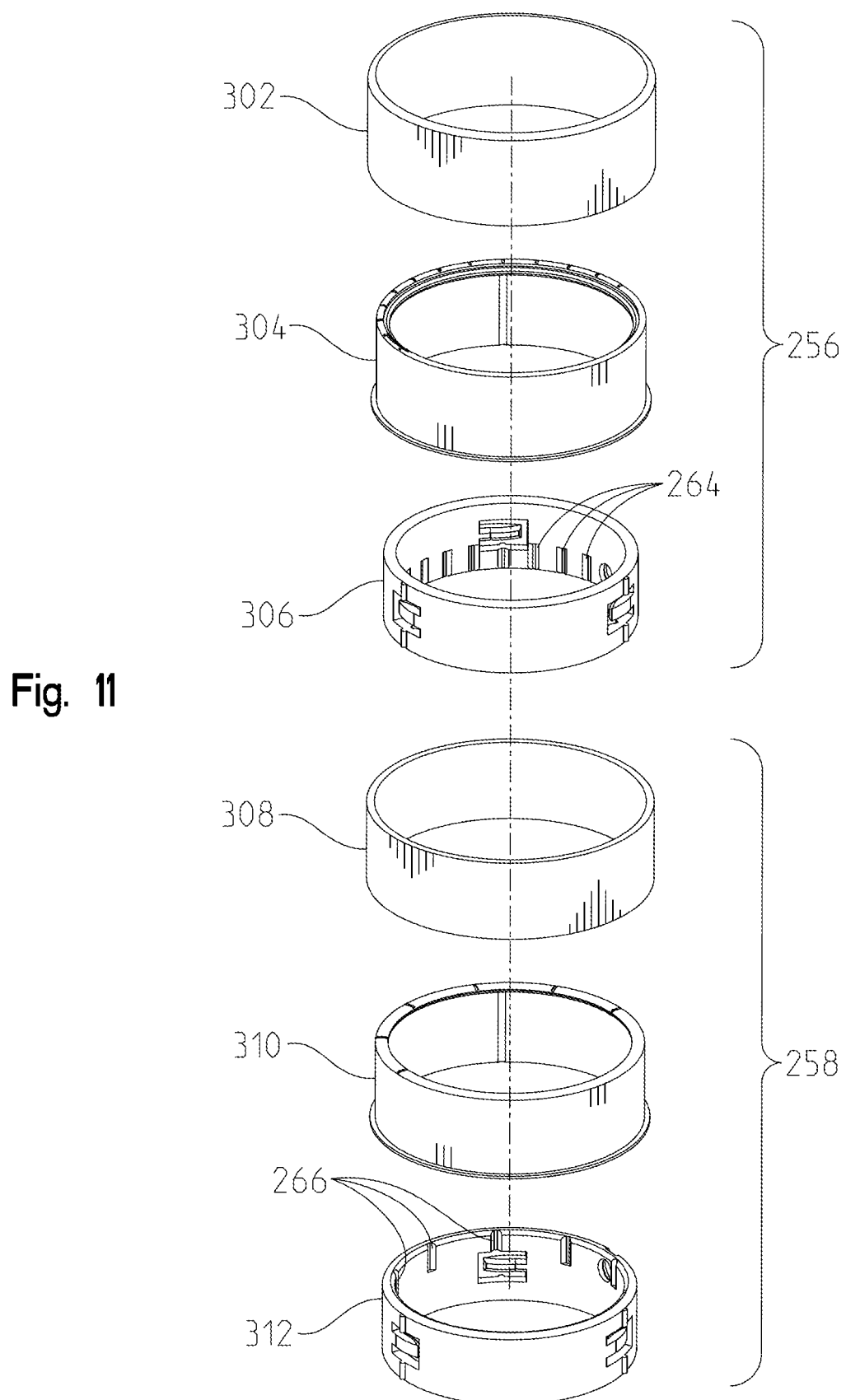
FIG. 11 is an exploded view of the dials of FIG. 10.
Figure 12:
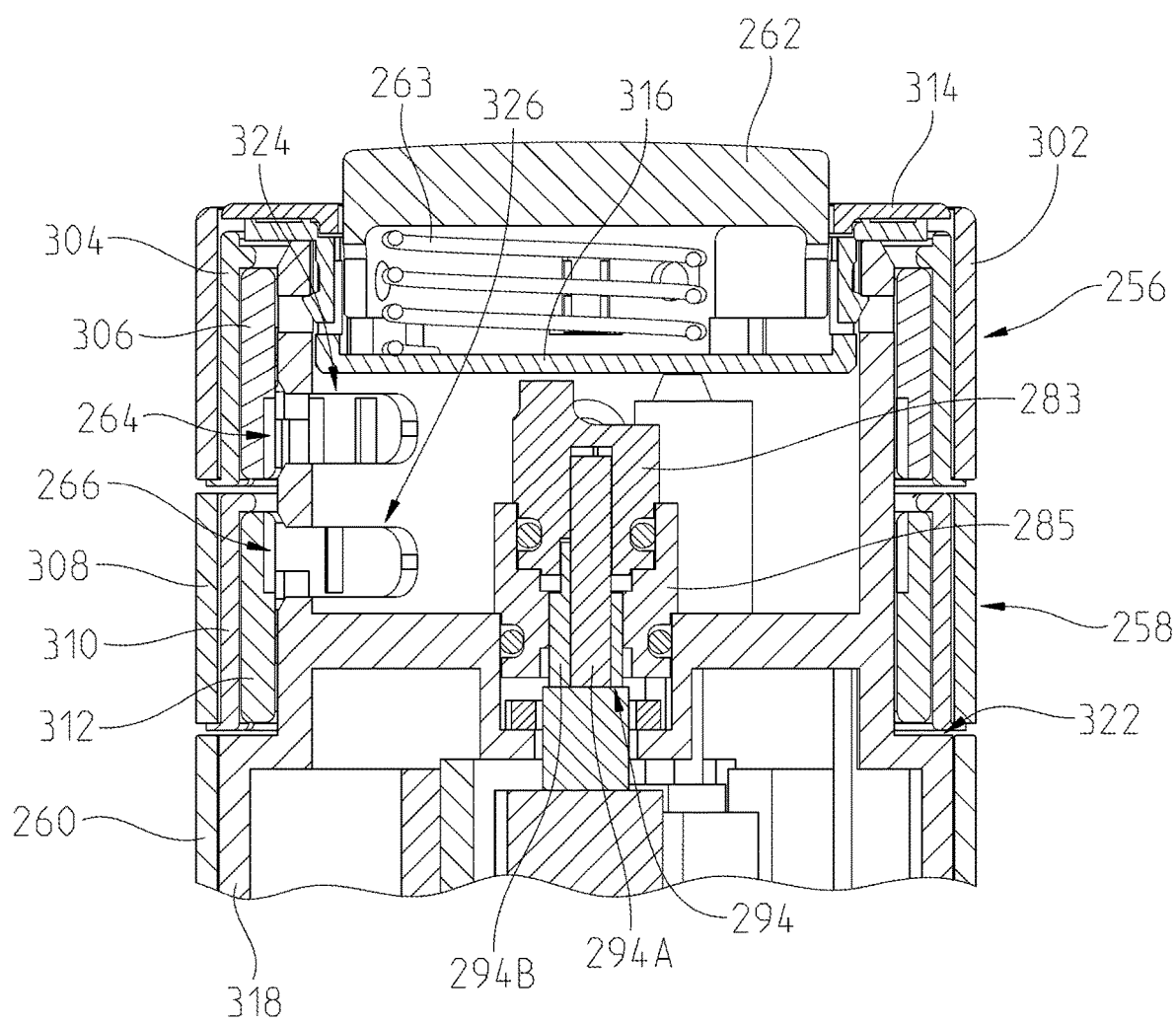
FIG. 12 is a detailed cross-sectional view of the upper portion of the metered dispense input device of FIG. 2.
Figure 13:
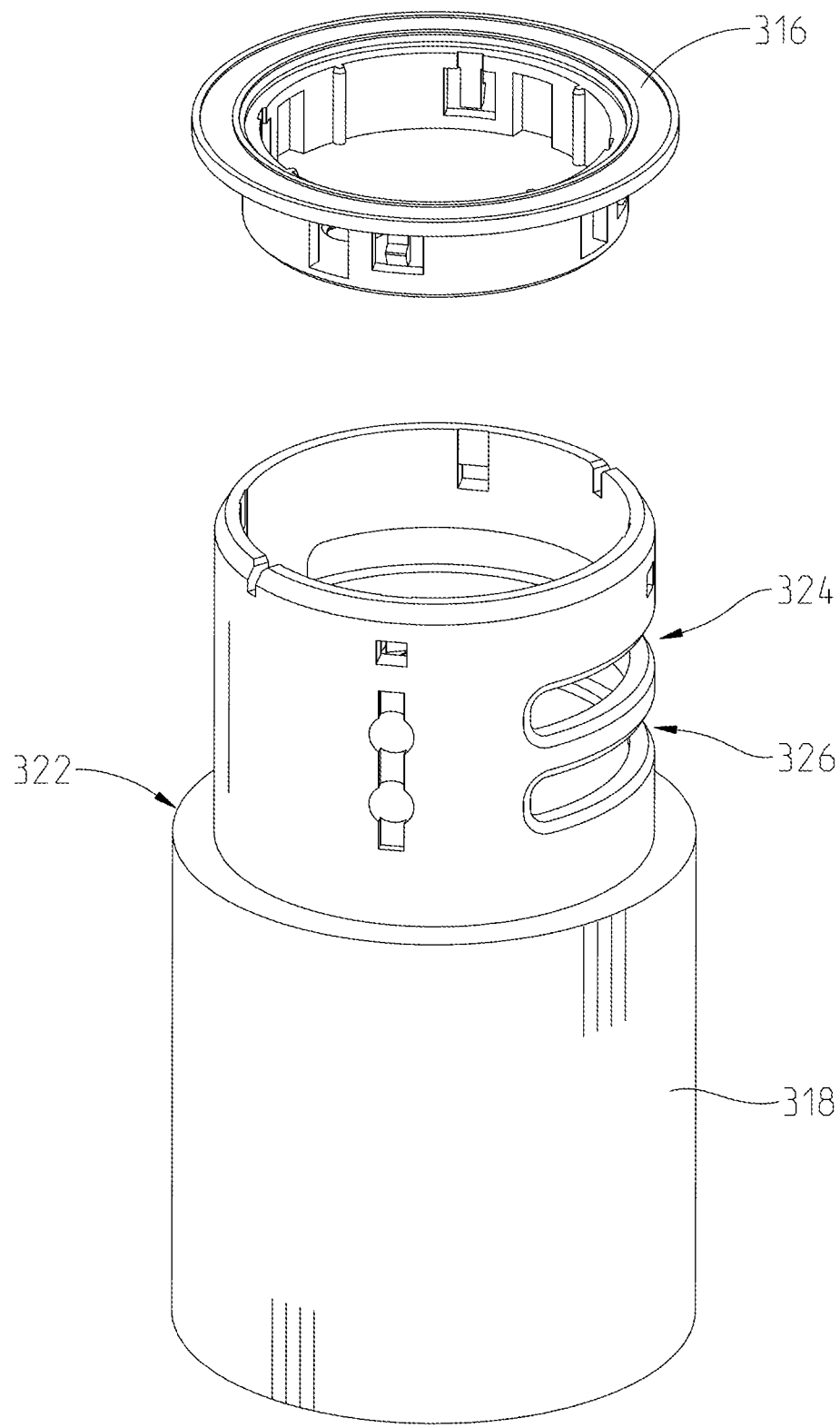
FIG. 13 is an exploded view of a shell of the metered dispense input device of FIG. 2.
Figure 14:
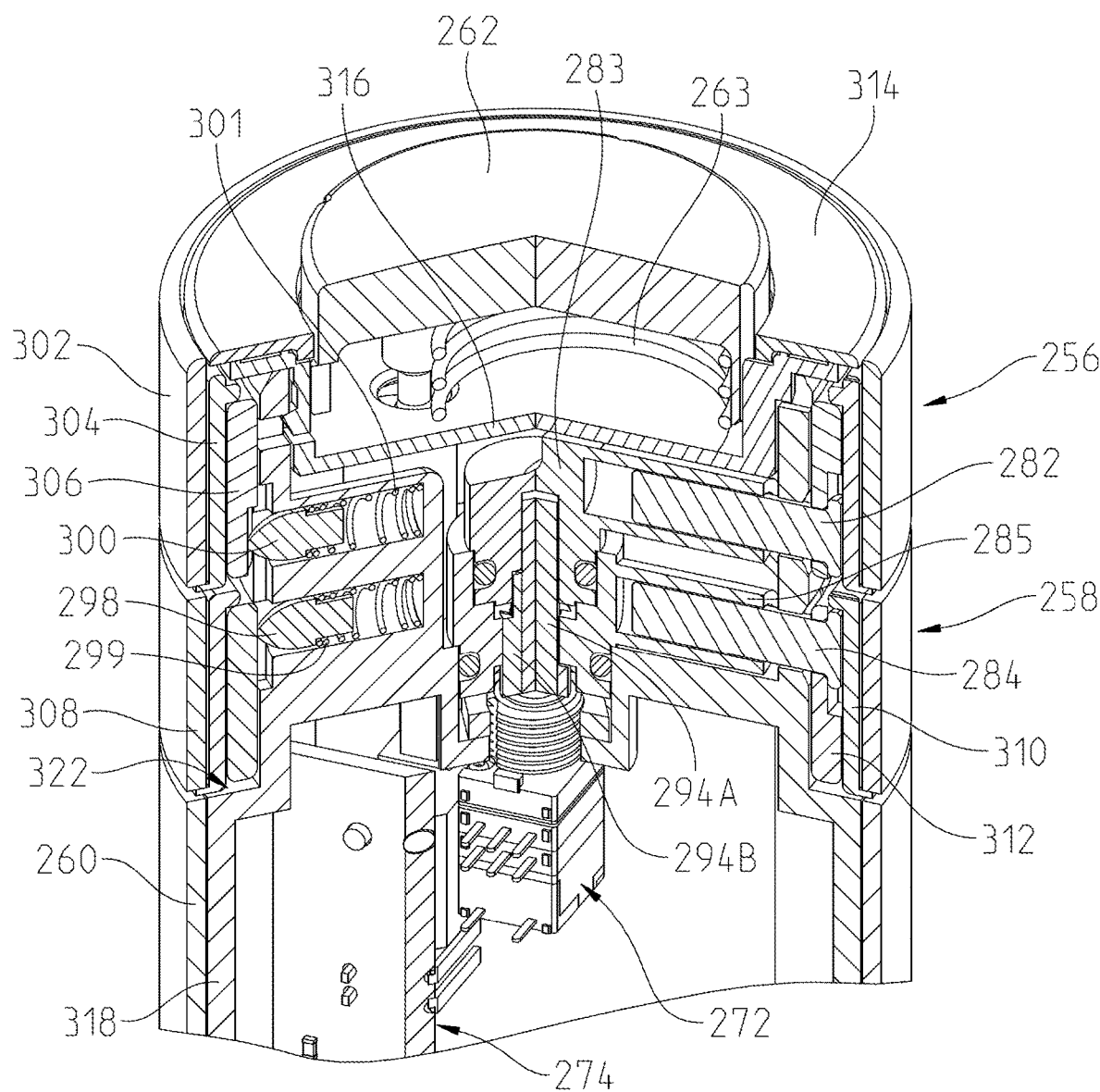
FIG. 14 is a perspective view in cross-section of the metered dispense input device of FIG. 2.

As shown generally in FIGS. 2-14 and more specifically in FIGS. 10 and 11, the quantity dial 256 includes an outer ring 302, a middle ring 304, and an inner ring 306. Similarly, the units dial 258 includes an outer ring 308, a middle ring 310, and an inner ring 312. The outer rings 302, 308 provide tangible surfaces which the user contacts to rotate the dials 256, 258 during operation of the metered dispense input device 252. The middle rings 304, 310 function to rotatably couple the respective outer rings 302, 308 to the inner rings 306, 312. The inner rings 306, 312 support the linkages 284, 282 that are configured to connect dials 256, 258 to potentiometer 272, as further discussed herein.

The inner ring 306 of the quantity dial 256 further includes circumferentially spaced recesses, illustratively grooves 264, along the inside surface of the inner ring 306. The grooves 264 are configured to selectively receive a detent 300 (FIGS. 3 and 11), wherein each groove 264 corresponds with an available quantity selection. A spring 301 biases the detent 300 radially outwardly for engagement with a selected groove 264. The inner ring 312 of the units dial 258 further includes circumferentially spaced recesses, illustratively grooves 266, along the inside surface of the inner ring 312. The grooves 266 are configured to selectively receive a detent 298 (FIG. 3), wherein each groove 266 corresponds with an available serving size. A spring 299 biases the detent 298 radially outwardly for engagement with a selected groove 266. The engagements of the detents 300, 298 in the corresponding grooves 264, 266 yield an amount of liquid that is communicated to the wireless control module 200 and the communicated amount of liquid is subsequently dispensed from the electronic faucet 10 upon actuation by operation of the activation button 262. In one illustrative embodiment, the engagement of the detents 300, 298 in the corresponding grooves 264, 266 may also yield an auditory output of the selected quantity and serving size via the wireless connection 254 between the metered dispense input device 252 and the electronic faucet 10.

Figure 4:
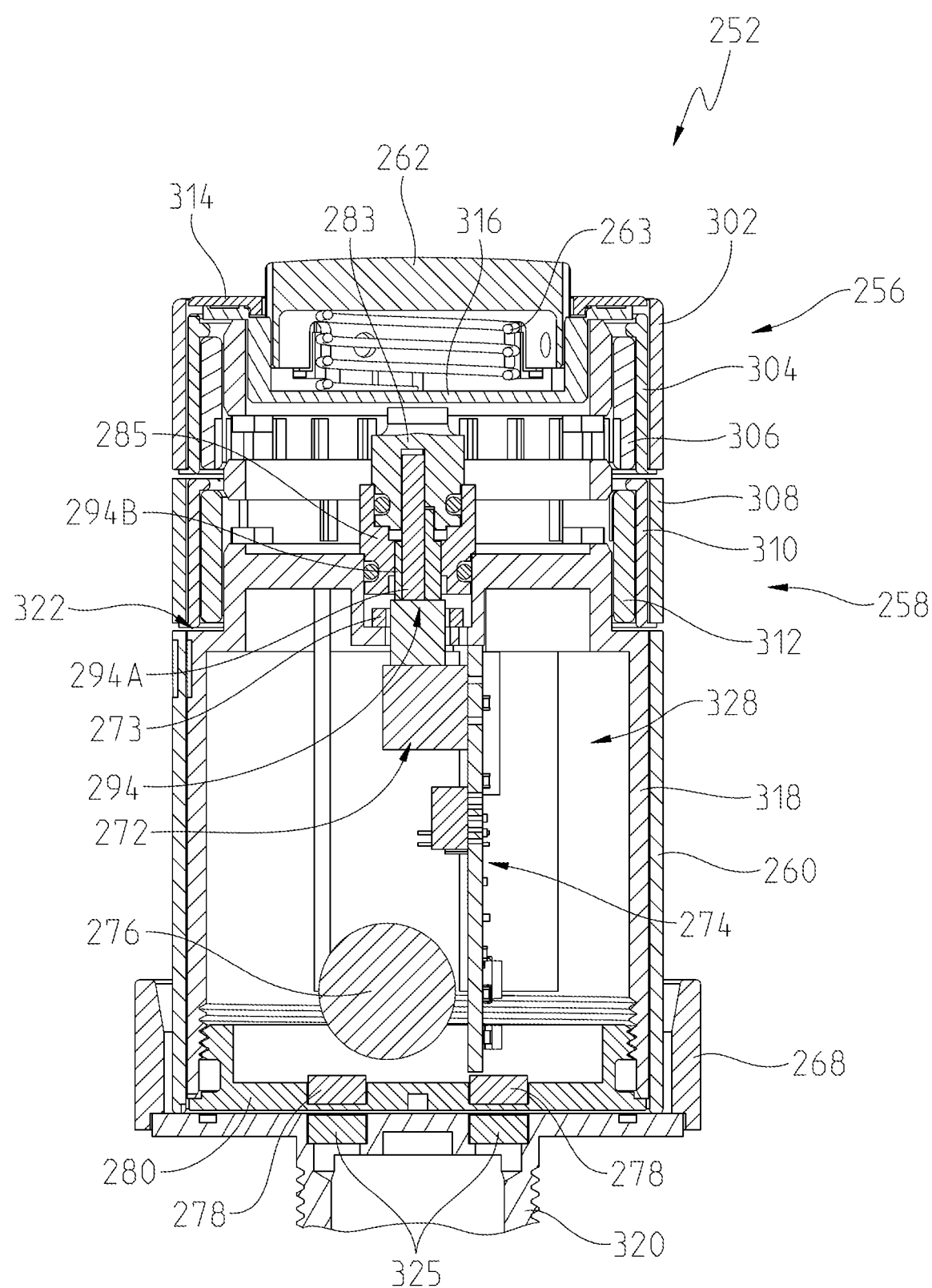
FIG. 4 is another cross-sectional view of the metered dispense input device of FIG. 2.

Referring now to the illustrative embodiment of FIGS. 3-5, an outer shell 260 provides a housing for the internal components of the metered dispense input device 252 discussed further herein. The outer shell 260 is adjacent to and coupled to an inner shell 318. The inner shell 318 illustratively extends beyond the height of the outer shell 260 and is contoured to provide a ledge 322 upon which the quantity dial 256 and the units dial 258 are positioned. As shown in at least FIGS. 6-9, the inner shell 318 includes apertures 324, 326 that are configured to receive linkage 282 of the quantity dial and linkage 284 of the units dial 258, respectively, to operably couple the quantity dial 256 and the units dial 258 relative to the inner shell 318.

As shown in the illustrative embodiment of FIGS. 3-5, the inner shell 318 is threadingly engaged with a battery access cover 280 to provide an inner chamber 328 within the metered dispense input device 252. The circuit card 274 is illustratively positioned within the inner chamber 328, and includes the processor 242 and the potentiometer 272. The potentiometer 272 is illustratively coupled to the circuit card 274 via soldering, while a threaded nut 273 illustratively couples the potentiometer 272 and the attached circuit card 274 to the inner shell 318. The potentiometer 272 illustratively includes a potentiometer shaft 294 operably coupled to the linkages 282 and 284 via connectors 283 and 285, such as sleeves, respectively. In an illustrative embodiment, the potentiometer shaft 294 is a coaxial dual shaft type having a rotatable inner shaft 294A and an independently rotatable outer shaft 294B, each providing independent position readings for the quantity dial 256 and the units dial 258. The connectors 283 and 285 receive the linkages 282 and 284 to connect the dials 256 and 258 to the potentiometer shafts 294A and 294B. Such an arrangement facilitates having a small opening in the bulkhead of the metered dispense input device 252, which minimizes the diameter of o-rings 286 and 288 operably coupled to the connectors 283 and 285, respectively. Such minimization of the diameters for o-rings 286 and 288 enable the user to apply a light pressure to turn the quantity dial 256 and the units dial 258 due to the mechanical advantage provided to the user in relation to the drag of o-rings 286 and 288. For example, the diameters of o-rings 286 and 288 are several times smaller than the diameter of either dial 256 and 258 onto which the user is applying force.

As further shown in FIG. 3, the potentiometer shaft 294 functions to receive the user's quantity and serving size selections via the quantity dial 256 and the units dial 258 and transmit the selections to the potentiometer 272. In one embodiment, the potentiometer shaft 294 is integrally formed with potentiometer 272. The potentiometer shafts 294 extend through the potentiometer 272 and rotate the electrical components inside, varying the resistance of the potentiometer 272 thereby, allowing the circuit card 274 to "read" the position of the potentiometer shafts 294. The inner potentiometer shaft 294A and the outer potentiometer shaft 294B communicate with the quantity dial 256 and the units dial 258, respectively, such that each of the inner shaft 294A and the outer shaft 294B can provide independent position readings. In another illustrative embodiment, the inner potentiometer shaft 294A and the outer potentiometer shaft 294B communicate with the units dial 258 and the quantity dial 256, respectively.

The potentiometer 272 functions to receive the signal (of the user's quantity and serving size selections) from the shaft 294 and transmit the signal to the processor of the circuit card 274, illustratively upon actuation of the activation button 262. In some embodiments, alternatives to the potentiometer 272 may be utilized. For example, other rotary sensors may be used, such as magnets in dials 256, 258 with magnetic sensors to operate the metered dispense input device 252. A switch, such as a microswitch, or an encoder may also be implemented to indicate rotational positions of the dials 256 and 258.

The circuit card 274 may be electrically coupled to a power supply that is configured to provide power to the metered dispense input device 252. The power supply may illustratively be a battery 276, or may otherwise be a capacitor, a hydrogenator, or may otherwise be hard wired or capable of wireless charging. The circuit card 274 may further include an electrical button 292 operably coupled to the activation button 262 to operate the metered dispense input device 252 as discussed earlier. A threaded piston 290 and a connecting pin 293 may operably couple the activation button 262 to the electrical button 292.

The battery access cover 280 may include a magnet 278 configured to magnetically couple the metered dispense input device 252 to a threaded anchor 320 to install the metered dispense input device 252 on a mounting deck, such as a sink deck (not shown), using a mount 268. In alternate embodiments, the metered dispense input device 252 may be coupled to the mount deck by using alternate methods, such as via an adhesive. In yet additional embodiments, the metered dispense input device 252 may be modified to be removably or permanently attached to a faucet 10 and/or its components (e.g., electronic proportioning valve (EPV), solenoid valve, etc.). If permanently attached to the faucet 10, the metered dispense input device 252 may be hard wired to the faucet 10 and the system of the faucet 10 with the metered dispense input device 252 could be battery powered or otherwise powered as described above.

Referring specifically to FIG. 4, in an embodiment having the threaded anchor 320, the threaded anchor 320 is positioned adjacent to the battery access cover 280 and includes magnets 325 that are magnetically coupled to the magnet(s) 278 of the battery access cover 280. The magnetic coupling of the magnets 278 with the magnets 325 assist in orienting and retaining the metered dispense input device 252. Further, such a magnetic coupling enables a user to easily remove the metered dispense input device 252 from a mounting deck and operate the metered dispense input device 252 remotely from the mounting deck, for example, in a user's hand via battery 276. In other illustrative embodiments, the threaded anchor 320 may be attached to the battery access cover 280 via other coupling means such as an adhesive.

Figure 6:
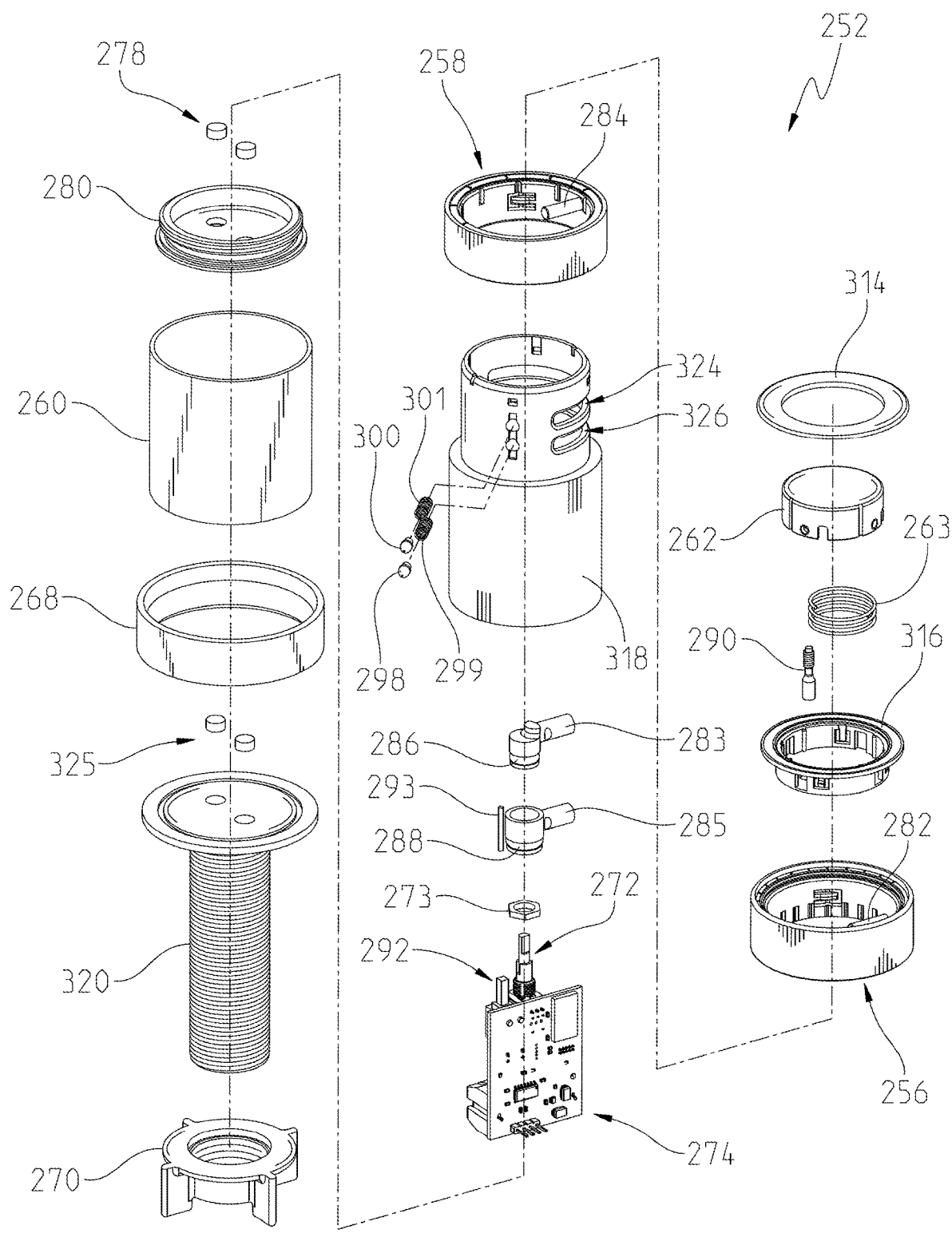
FIG. 6 is an exploded perspective view of the metered dispense input device of FIG. 2.

Now referring specifically to FIGS. 2 and 6, a nut 270 may be threadingly engaged with the threaded anchor 320 and configured to cooperate with the magnets 278, 325 to mount the metered dispense input device 252 to the mount deck. The nut 270 is adjustable along the anchor 320 and functions to retain the anchor 320 on the mount deck (not shown). Then, to mount the metered dispense input device 252, the magnets 278, 325 are magnetically coupled to each other as discussed above. Such a mounting configuration enables removal or dismounting of the metered dispense input device 252 without unthreading the nut 270 along the anchor 320.

In one illustrative embodiment, to operate the metered dispense input device 252, a user may activate the metered dispense input device 252 by depressing the activation button 262 so that the button 262 slides on the grooves in the seat 316, returning to its original position once no longer actuated due to the spring loaded configuration of the button 262. The activation button 262 may be attached by the threaded piston 290 that slides in a piston bore, ensuring the piston 290 slides smoothly and maintains its orientation. When the activation button 262 is depressed, the small pin 293 coupled to the piston 290 may pass through an o-ring 296 (FIG. 5) to contact the button 292 on the circuit card 274. Such an arrangement allows minimization of the size of the metered dispense input device 252 and also allows minimization of the size of the o-ring 296. By minimizing the size of the o-ring 296, the resistance to pushing the button 262 is reduced while still maintaining a watertight seal.

In subsequent operation of the metered dispense input device 252, the user rotates the quantity dial 256 and/or the units dial 258 to the desired position for dispensing the appropriate amount of water, if needed. As discussed previously, each user-selectable position for the quantity dial 256 and the units dial 258 has a matching notch on the inner diameter of the corresponding dial to receive a dampened spring plunger or the respective detents 300, 298, as discussed above. The shaped end of the respective spring plungers or the respective detents 300, 298 pull the rings of the dials 256, 258 into precise position once the user rotates the dial close enough for the respective detents 300, 298 to enter the respective grooves 264, 266 as discussed above.

Once the device 252 is activated, software within the processor 242 on the printed circuit board 274 reads the potentiometer values and has a correlated range of readings for each position on each of the quantity dial 256 and the units dial 258. If either the quantity dial 256 or the units dial 258 are slightly to the right or left of specific value, the software will interpret that input as the closest specific value. Furthermore, the software is specifically programmed to ignore multiple actuations of the button 262 in quick succession to reduce user errors. That is, a button press or button presses of the activation button 262 after the initial activation will be ignored until the dispense is complete. This allows for repeatable potentiometer readings for each position and provides tactile and auditory feedback to the user.

When the activation button 262 is pressed, a latching circuit maintains electricity to the functional circuits of the circuit card 274 until the metered dispense input device 252 finishes reading the potentiometer 272 values and wirelessly transmits the values and the activation command to the control module 200, that is in line with the mixed water flow through the electrically operable valve 22. The control module 200 then communicates to the corresponding solenoid(s) 22 to activate and measure the flow of water until the desired amount input by the user has exited the faucet 10 at which time, the controller 200 closes the solenoid valve 22 and awaits the next wireless communication from the metered dispense input device 252. In one embodiment, the controller 200 is powered with alternating current (AC). However, it is within the scope of the present disclosure that the controller 200 is alternatively powered.

In one illustrative embodiment, the user can use a touch interface of the metered dispense input device 252 to command the solenoid valve 22 of the faucet 10 to close during a dispense process. In this instance, the dispense action is cancelled via the control module 200, and the faucet 10 returns to regular operation and awaits further input from the user. Moreover, the flow rate and temperature of the exiting liquid can be adjusted through an inline mixing and volume control valve in the faucet 10 without altering the dispense function command from the metered dispense input device 252 unless the manual valve 20 is in an off position to prevent liquid discharge.

Figure 15:
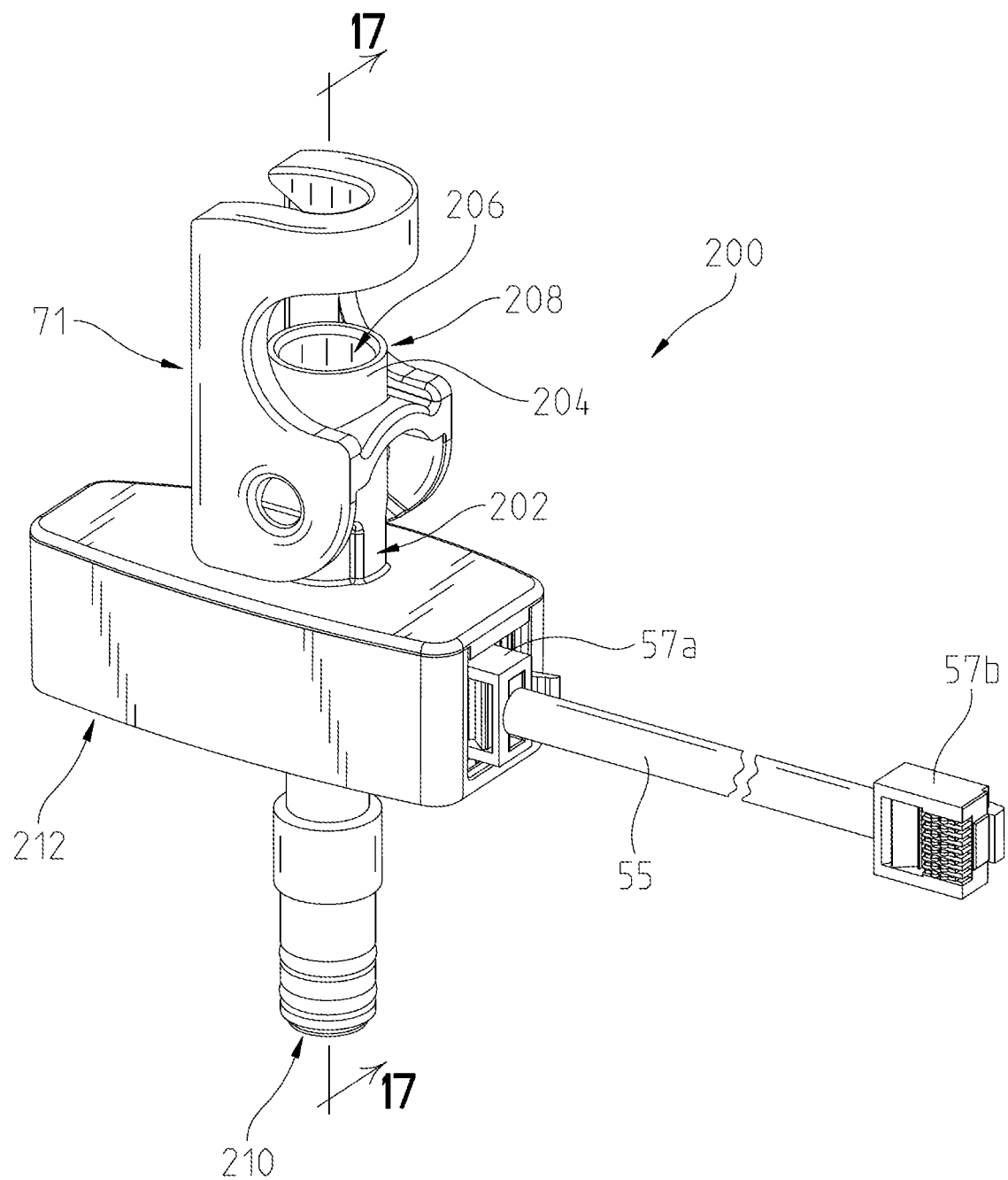
FIG. 15 is a perspective view of an illustrative wireless control module of FIG. 1.
Figure 16A:
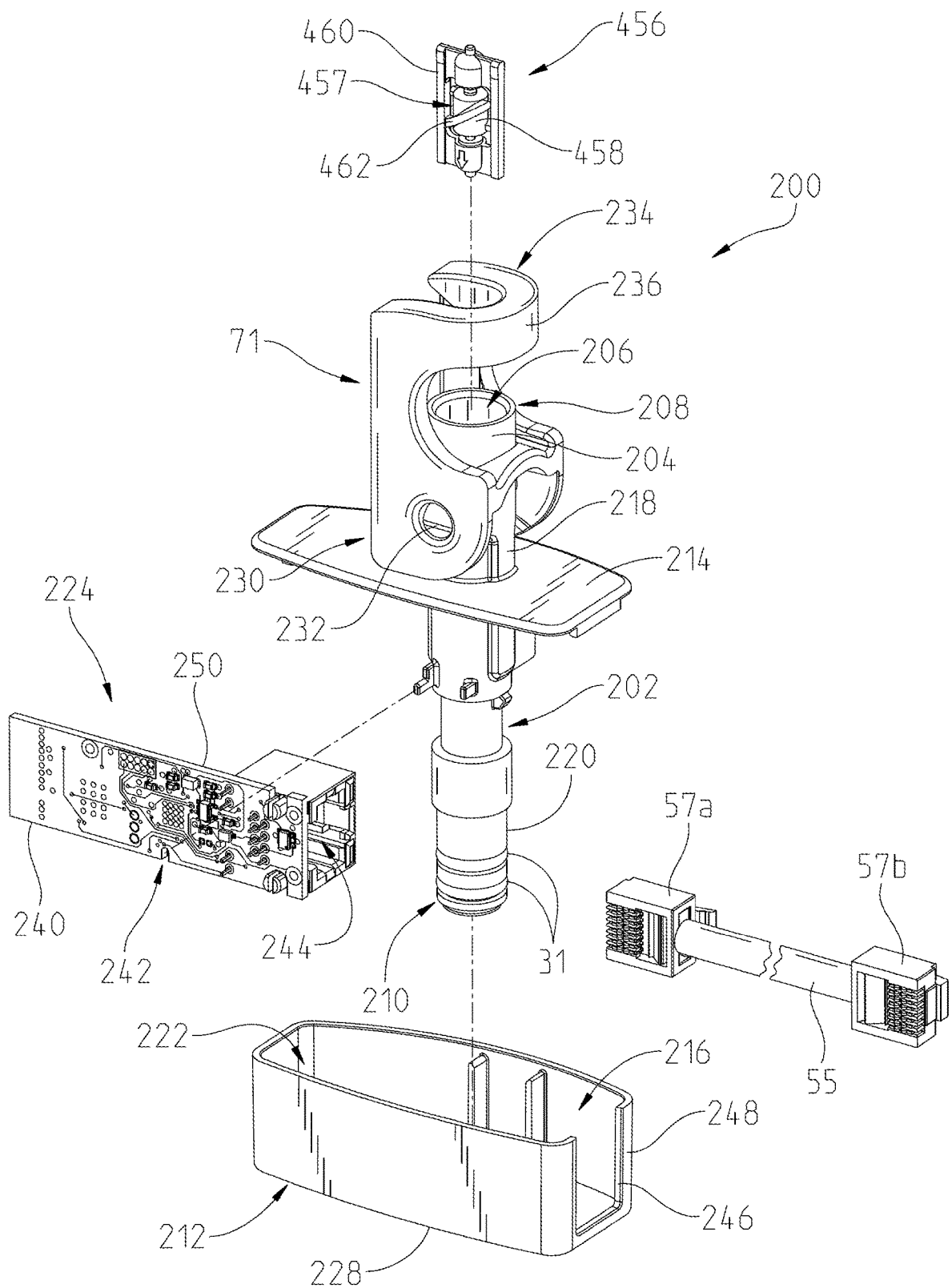
FIG. 16A is an exploded perspective view of the illustrative wireless control module of FIG. 15.
Figure 16B:
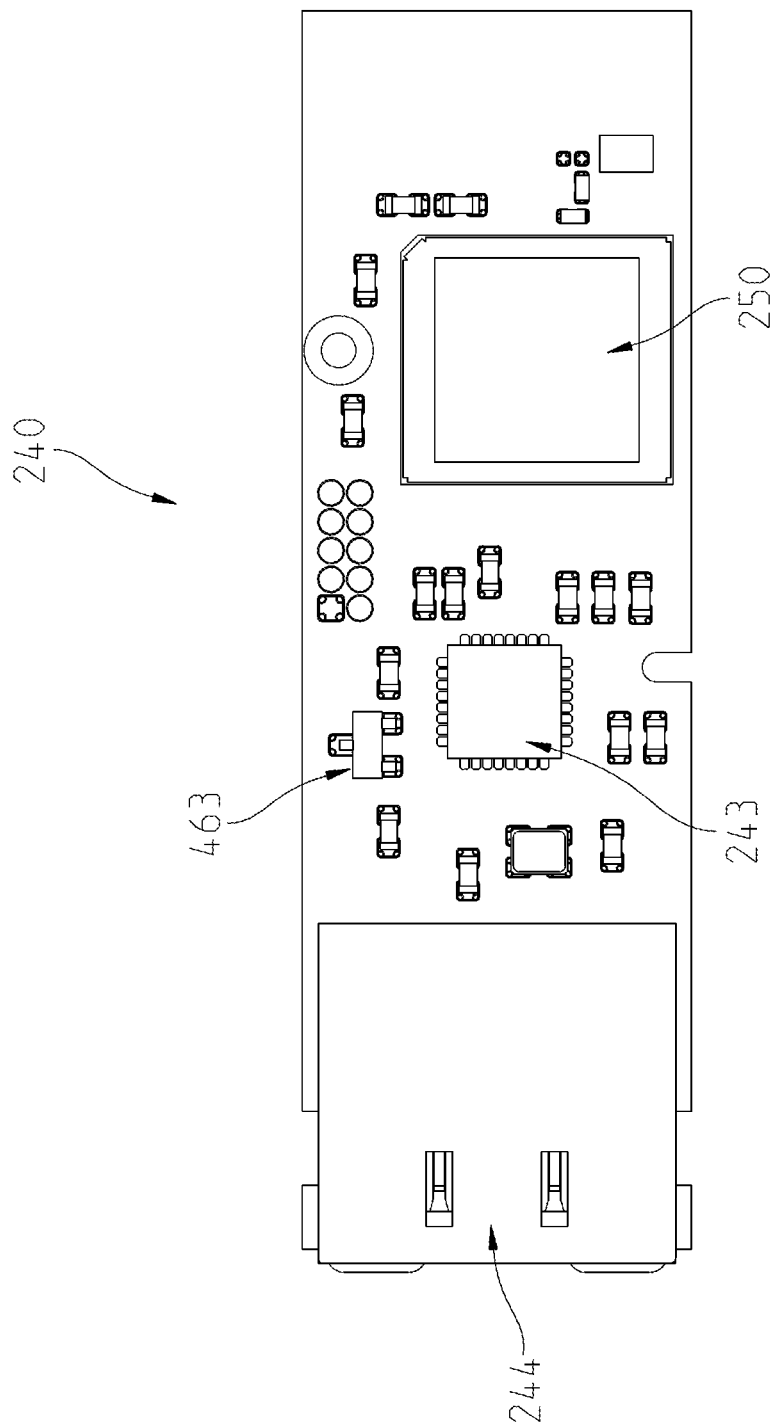
FIG. 16B is a plan view of the printed circuit board of FIG. 16A.
Figure 17:
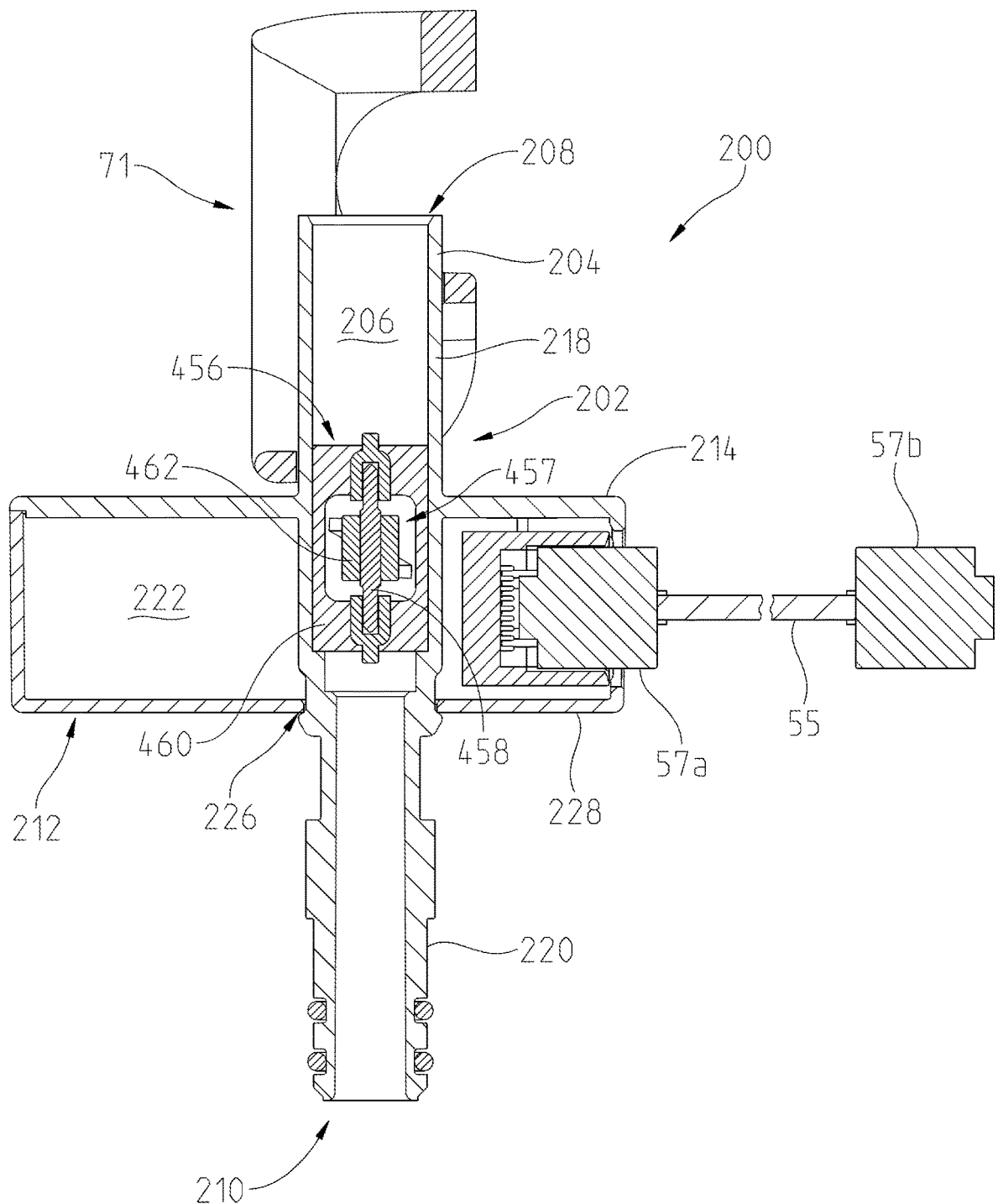
FIG. 17 is a cross-sectional view taken along line 17-17 of FIG. 15.

With reference to FIGS. 15-17, the illustrative wireless control module 200 includes a main body 202 including a tube 204 defining a waterway or fluid passageway 206 extending between an inlet 208 and an outlet 210. The main body 202 may be formed from a polymer, such as a glass fiber reinforced thermoplastic material. A housing or cover 212 is coupled to the main body 202. More particularly, an end wall 214 of the main body 202 is coupled to an open end 216 of the housing 212. The housing 212 may be formed from a polymer, such as an acetal copolymer. An inlet portion 218 of the tube 204 extends in a first direction from the end wall 214, and an outlet portion 220 of the tube 204 extends in a second direction, opposite the first direction, from the end wall 214. A chamber 222 is defined within the housing 212 and receives the wireless control module 200. The outlet portion 220 of the tube 204 extends through the chamber 222 and out of the housing 212 via an opening 226 in an end wall 228 of the housing 212.

The inlet 208 is fluidly coupled to an outlet of the solenoid valve assembly 22, the outlet corresponding with the water passageway 28*d* of FIG. 1. The outlet 210 of the control module 200 is fluidly coupled to the water outlet 19 of the spout 12 (FIG. 1). More particularly, the inlet portion 218 of the tube 204 receives the outlet tube corresponding with water passageway 28*d* (FIG. 1) of the solenoid valve assembly 22. A swing clip 71 of the control module 200 secures the outlet tube corresponding with water passageway 28*d* (FIG. 1) of the solenoid valve assembly 22 to the tube 204 of the wireless control module 200. More particularly, a first end 230 of the swing clip 71 is pivotably coupled to pins 232 on the inlet portion 218 of the tube 204. The outlet portion 220 of the tube 204 is received within a passageway in fluid communication with the water outlet 19 of the spout 12 (FIG. 1). An O-ring 31 may be positioned intermediate the tube 204 and the passageway to provide fluid sealing therebetween.

The wireless control module 200 illustratively includes a printed circuit board 240 received within the chamber 222 of the housing 212. The printed circuit board 240 illustratively supports a processor 243, such as a conventional microprocessor. An auxiliary port 244 may also be supported by the printed circuit board 240 and may be in electrical communication with the valve controller 24. The auxiliary port 244 is accessible through an opening 246 in a side wall 248 of the housing 212.

The wireless transceiver 250 is illustratively supported by the printed circuit board 240 and is in electrical communication with the wireless control module 200. The wireless transceiver 250 is configured to wirelessly communicate (e.g., receive and/or transmit wireless signals) with the metered dispense input device 252. Such wireless communications may be via known technologies, such as wireless communications in the 2.4 GHz frequency band including, for example Wi-Fi, ZigBee, and Bluetooth. The wireless transceiver 250 illustratively comprises a wireless radio and antenna, such as a Wi-Fi module or chip, a ZigBee module, or a Bluetooth module. In one illustrative embodiment, the wireless transceiver 250 comprises a chip configured to be in communication with the wireless connection 254. In one embodiment, the wireless connection 254 between transceiver 250 and metered dispense input device 252 is a Bluetooth or radio frequency connection. In an alternate embodiment, the connection is a Wi-Fi connection. In an alternate embodiment, the metered dispense input device 252 may comprise a voice recognition and conversion device in wireless communication with the transceiver 250. As further detailed herein, the metered dispense input device 252 may communicate over the Internet through the cloud to the wireless control module 200.

A flow sensor 456 is illustratively supported by the tube 204 of the main body 202 to detect water flow within the waterway 206, and is in electrical communication with the wireless control module 200 and/or the valve controller 24 (FIG. 1). More particularly, the flow sensor 456 illustratively comprises a flow turbine assembly 457 including a flow turbine 458 supported for rotation by a flow turbine cage 460. The flow turbine cage 460 may be received within the tube 204 such that water flow through the passageway 206 rotates the flow turbine 458. The flow turbine 458 may be a magnetic flow turbine including a magnet supported by rotor 462 and a sensor or detector 463 supported on the printed circuit board 240, the detector 463 being configured to detect rotation of the rotor 462. The number of rotations detected by the sensor 456 is correlated to flow rate and/or flow volume by the wireless control module 200 and/or the valve controller 24 (FIG. 1). The valve controller 24 (FIG. 1) controls the electrically operable solenoid valve 22 to dispense a predetermined amount of water based upon the input from the flow sensor 456.

The wireless control module 200 illustratively provides a means for reading the flow turbine 456, the temperature sensor 27 and the transceiver 250, such as Wi-Fi chip, ZigBee module, or Bluetooth module for receiving and transmitting data. An electronic cable 55 communicates commands between the wireless control module 200 and the electronic control valve 22. Illustratively, the electronic cable 55 is a serial cable including opposing first and second end connectors 57a and 57b. The first connector 57a is coupled to the port of the valve assembly 20, while the second connector 57b is coupled to the port 56 of the wireless control module 200.

A modular waterway design may permit the wireless control module 200 to be inserted between the outlet of the electronic control valve 22 and the waterway extending through faucet spout 12.

A serial protocol illustratively exists between the wireless control module 200 and the processor 42. Serial communication between the control module 200 and the processor 42 is configured to occur bi-directionally. In addition to transmitting and receiving data signals, an 'interrupt' signal may be used to indicate to the recipient that a data transmission is about to begin. The interrupt signal allows both the wireless control module 200 and the processor 42 to go into low-power sleep modes until one is woken-up up by the other using the interrupt signal. This scheme allows for both devices to operate for long periods of time on battery power; as they are not always fully powered-up waiting for data. The serial protocol to send data has been uniquely defined. It is all register based. For example, to set the water state, an auxiliary device or smart spout can write the value of '1' to register 0x02 to turn on the valve 22. As another example, an auxiliary device 30 can request the current water temperature by requesting the value currently stored in register 0x05 in the valve controller 24. All serial message packets use a start byte, stop byte, message length byte and two byte cyclic redundancy check (CRC) to ensure data integrity.

While the above description illustrates the valve assembly and the wireless control module for use in connection with an electronic faucet 10, such as a kitchen faucet, it should be appreciated that they may be used in connection with other devices, such as a shower valve, a bathtub valve, a toilet, etc.

Figure 18:
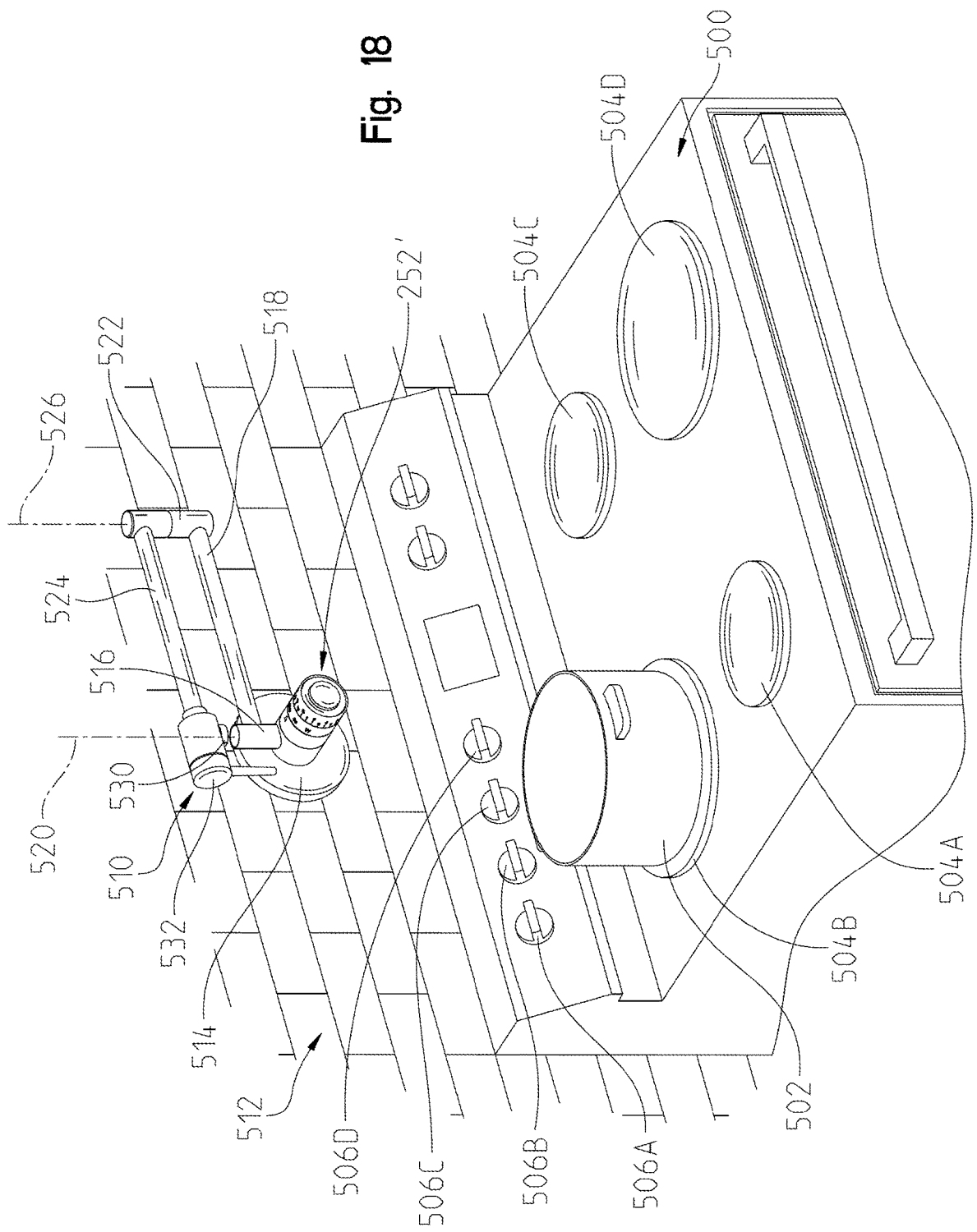
FIG. 18 is a perspective view of an illustrative metered pot filler of the present disclosure, shown in a stored position.

FIGS. 18-23 show an illustrative embodiment pot filler 510 of the present disclosure. Specifically referring to FIG. 18, a metered dispense pot filler 510 is configured to be mounted on a vertical wall 512 with fluid access above a support, such as an appliance. For example, the metered dispense pot filler 510 may be supported above a stove 500, such that vessels 502, such as pots or pans can be filled in place, without transport to and from another water source. FIG. 18 shows a traditional stove 500 with four heating zones 504A, 504B, 504C, 504D controlled by user inputs or control dials 506A, 506B, 506C, 506D, respectively. As shown, pot 502 rests atop heating zone 504B. Stove 500 is illustratively positioned adjacent to wall 512.

Figure 19:
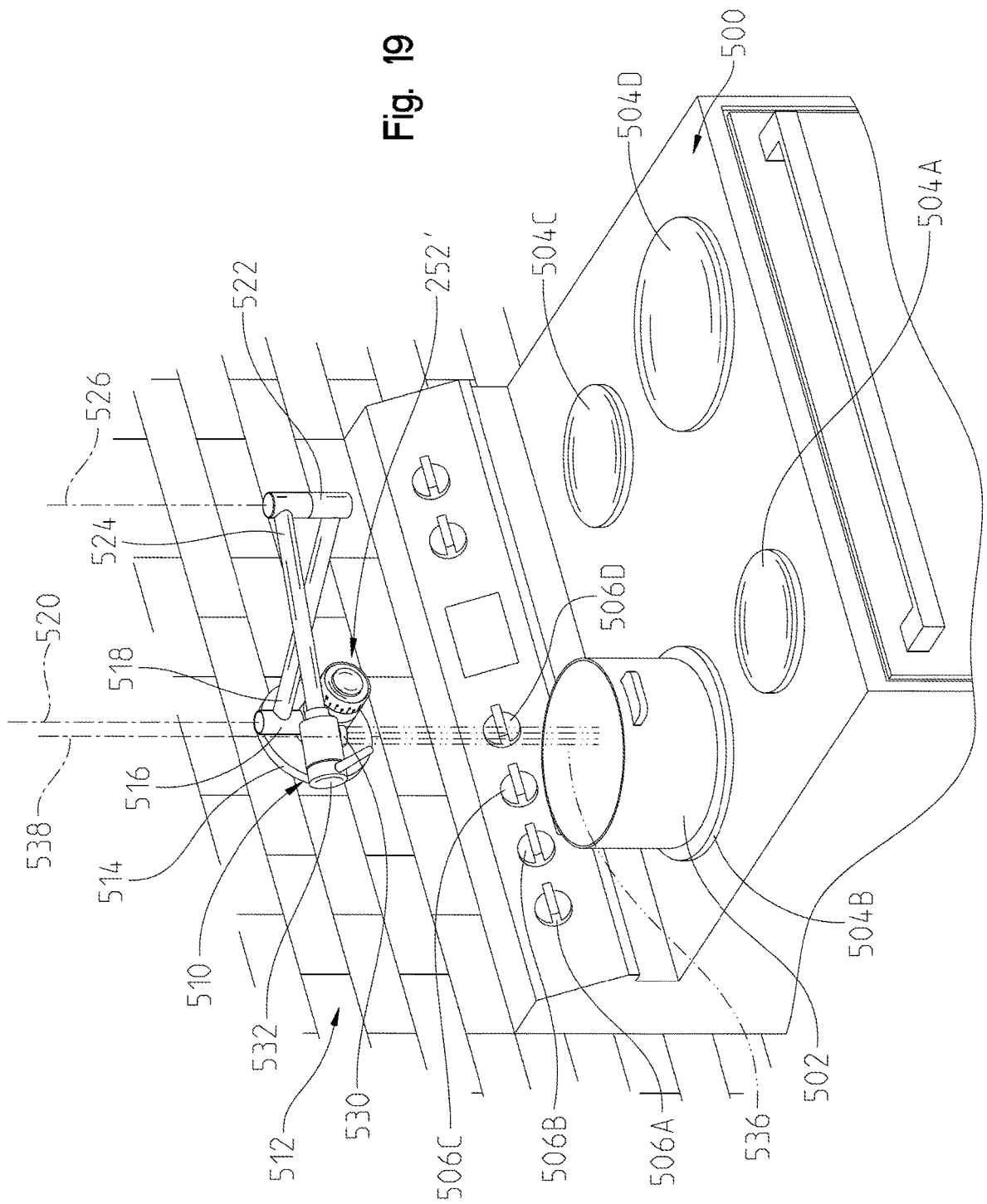
FIG. 19 is a perspective view of the metered pot filler of FIG. 18, shown in a fluid dispensing position.

Metered dispense pot filler 510 illustratively extends out from wall 512 vertically above stove 500, to leave enough vertical space for metered dispense pot filler 510 to clear any oversized pots 502. Metered dispense pot filler 510 includes escutcheon 514, metered dispense input device 252', first pivot coupler or swivel 516, first arm 518 configured to rotate about first vertical pivot axis 520, second pivot coupler or swivel 522, second arm 524 configured to rotate about second vertical pivot axis 526, fluid outlet 530, and manual input 532 controlling a manual valve 534. Pot filler 510 can move above pivot axes 520 and 526 between a retracted or stored position (FIG. 18) and an extended or dispense position (FIG. 19). In the dispense position, water flow 536 is discharged from outlet 530 along an outlet axis 538.

Metered dispense pot filler 510 easily fits in a standard 3.5" (2×4 framing) wall cavity and could be connected to a fluid coupler (e.g., a pipe nipple) like conventional pot fillers, with similar or different positioning of the pipe nipple (not shown). Additionally, a mounting ring could be anchored to the drywall and the body could be attached to that mounting ring (not shown). However, other mounting methods such as a rough mounting body are also envisioned. Furthermore, metered dispense pot filler 510 could be unscrewed from the mounting in a few minutes and the slid out to replace or clean control module 200 if solenoid valve 22 failed. Also, removal of escutcheon 514 allows access to replace a battery (in the embodiments where a battery is used).

Figure 20:
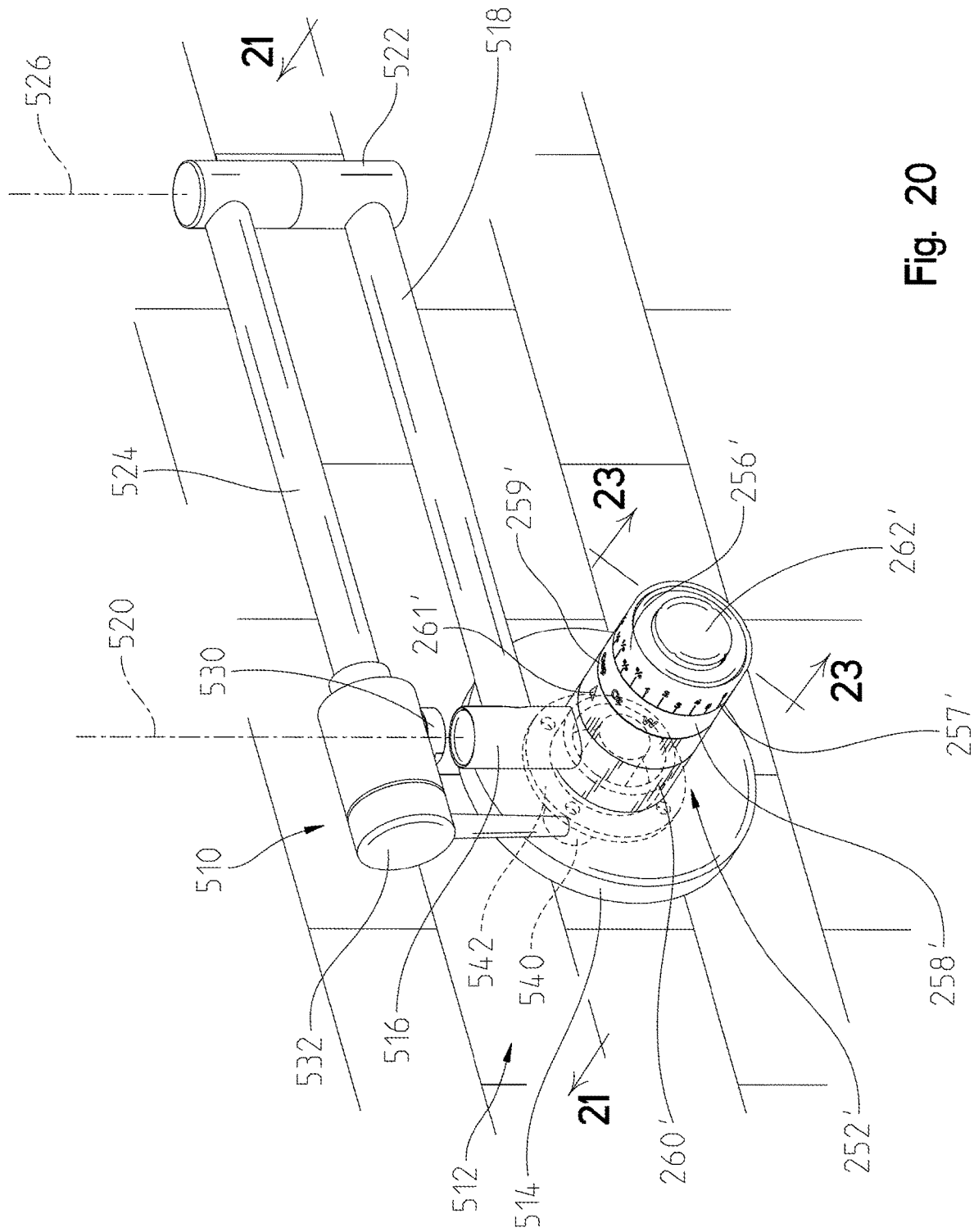
FIG. 20 is a close-up perspective view of the metered pot filler of FIG. 18.
Figure 21:
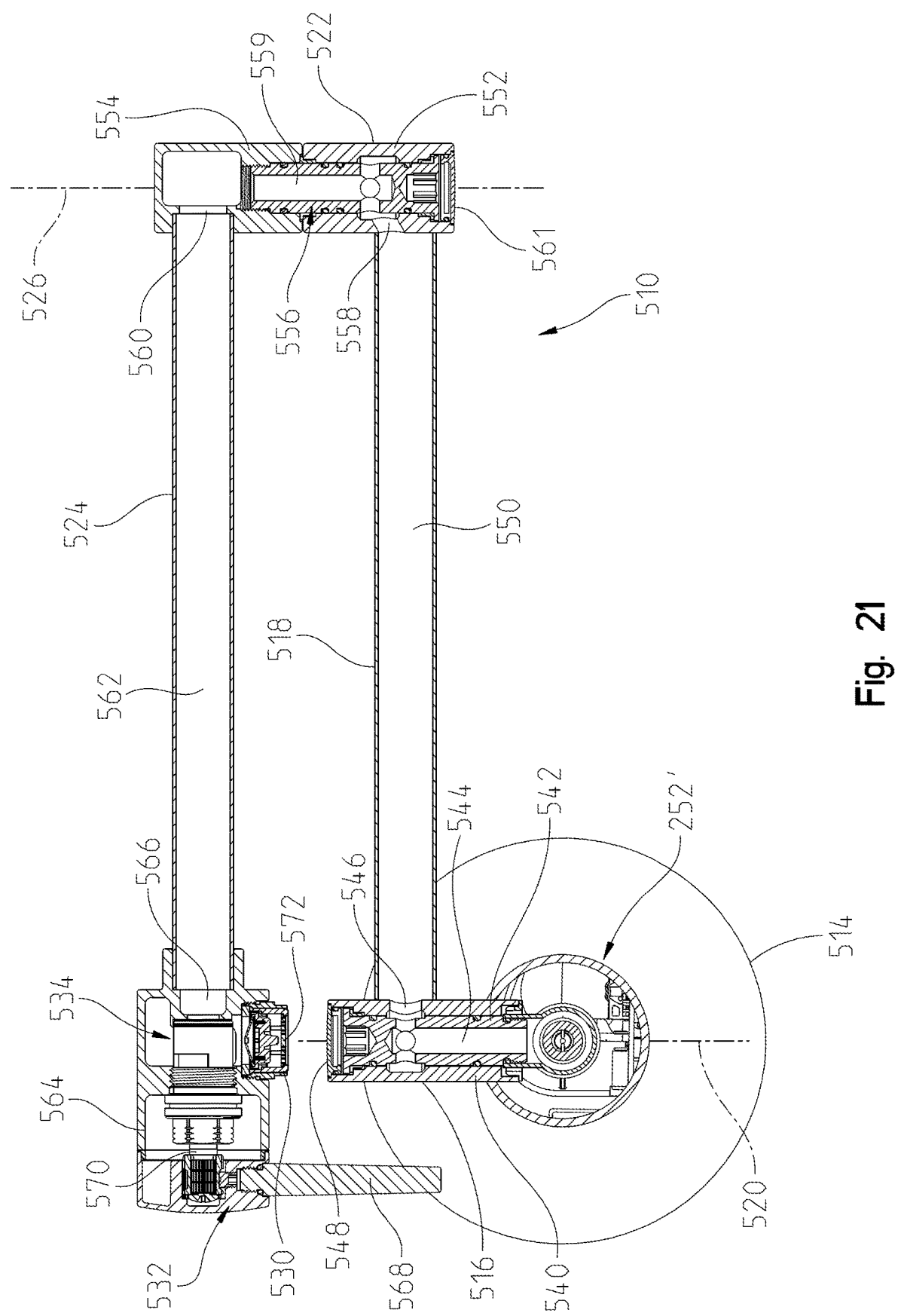
FIG. 21 is a cross-sectional view taken along line 21-21 of FIG. 20.

As shown in FIGS. 20 and 21, illustrative escutcheon 514 is disposed at the base of metered dispense pot filler 510 to cover any gap between metered dispense pot filler 510 and wall 512. Extending out from escutcheon 514 is metered dispense input device 252' which is similar to metered dispense input device 252, wherein similar parts are similarly labeled, and variations are identified with an identical reference number followed by a prime (') as a suffix. The differences between metered dispense input device 252' and metered dispense input device 252 will be discussed in greater detail below.

First swivel 516 extends vertically up from metered dispense input device 252'; first arm 518 extends from a first terminal end, horizontally out from first swivel 516; second swivel 522 extends vertically up from a second terminal end of first arm 518; and second arm 524 extends from a first terminal end, horizontally out from second swivel 522. First swivel 516 functions as a rotatable pivot point for a first terminal end of first arm 518 to illustratively rotate more than 180 degrees. Illustratively, first swivel 516 includes an outer tube 540 rotatably supported by an inner tube 542 defining an inner passageway 544. A port 546 illustratively provides fluid communication between inner passageway 544 and inner channel 550 of the first arm 518. A cap 548 fluidly seals an upper end of the first swivel 516.

Second swivel 522 functions as a rotatable pivot point for a first terminal end of second arm 524 to illustratively rotate up to 360 degrees about the second terminal end of first arm 518. Illustratively, second swivel 522 includes a lower outer tube 552 and an upper outer tube 554. An inner tube 556 is illustratively secured to the lower outer tube 552, wherein the upper outer tube 554 is rotatably supported by the inner tube 556 above the lower outer tube 552. The inner tube 556 defines an inner passageway 559 extending between a lower port 558 and an upper port 560. The lower port 558 illustratively provides fluid communication between inner passageway 559 and inner channel 550 of the first arm 518, while the upper port 560 illustratively provides fluid communication between inner passageway 559 and inner channel 562 of the second arm 524. A cap 561 fluidly seals a lower end of the second swivel 522.

First arm 518 and second arm 524 are hollow pipes, through which liquid flows when metered dispense pot filler 510 is activated. First swivel 516 and second swivel 522 may be of traditional pot filler swivel design and are configured to rotate while providing a sealed flow path for water to travel from fluid coupling in wall 512 to fluid outlet 530. Illustratively, fluid outlet 530 extends vertically down from the second terminal end of second arm 524; and manual input 532 is disposed at the second terminal end of second arm 524. Manual input 532 illustratively includes a handle 568 operably coupled to a valve stem 570 of manual valve 534. Manual valve 534 is received within a valve body 564 supported by second terminal end of second arm 524. A port 566 illustratively provides fluid communication between inner channel 562 of the second arm 524 and manual valve 534. An aerator 572 may be received within the fluid outlet 530.

In FIGS. 18 and 20, metered dispense pot filler 510 is shown mounted on wall 512 in a retracted or stored position, with first arm 518 rotated about first swivel 516 such that it is parallel to wall 512, and with second arm 524 rotated about second swivel 522 such that it is parallel to wall 512 and extending in an opposite direction of first arm 518. FIG. 19 illustrates metered dispense pot filler 510 in one of its many possible extended or dispense configurations. To reconfigured metered dispense pot filler 510, user pulls/pushes any portion first arm 518 and/or second arm 524 and place the outlet 530 where desired, such as over heating zone 504B to supply water to vessel 502.

Figure 22:
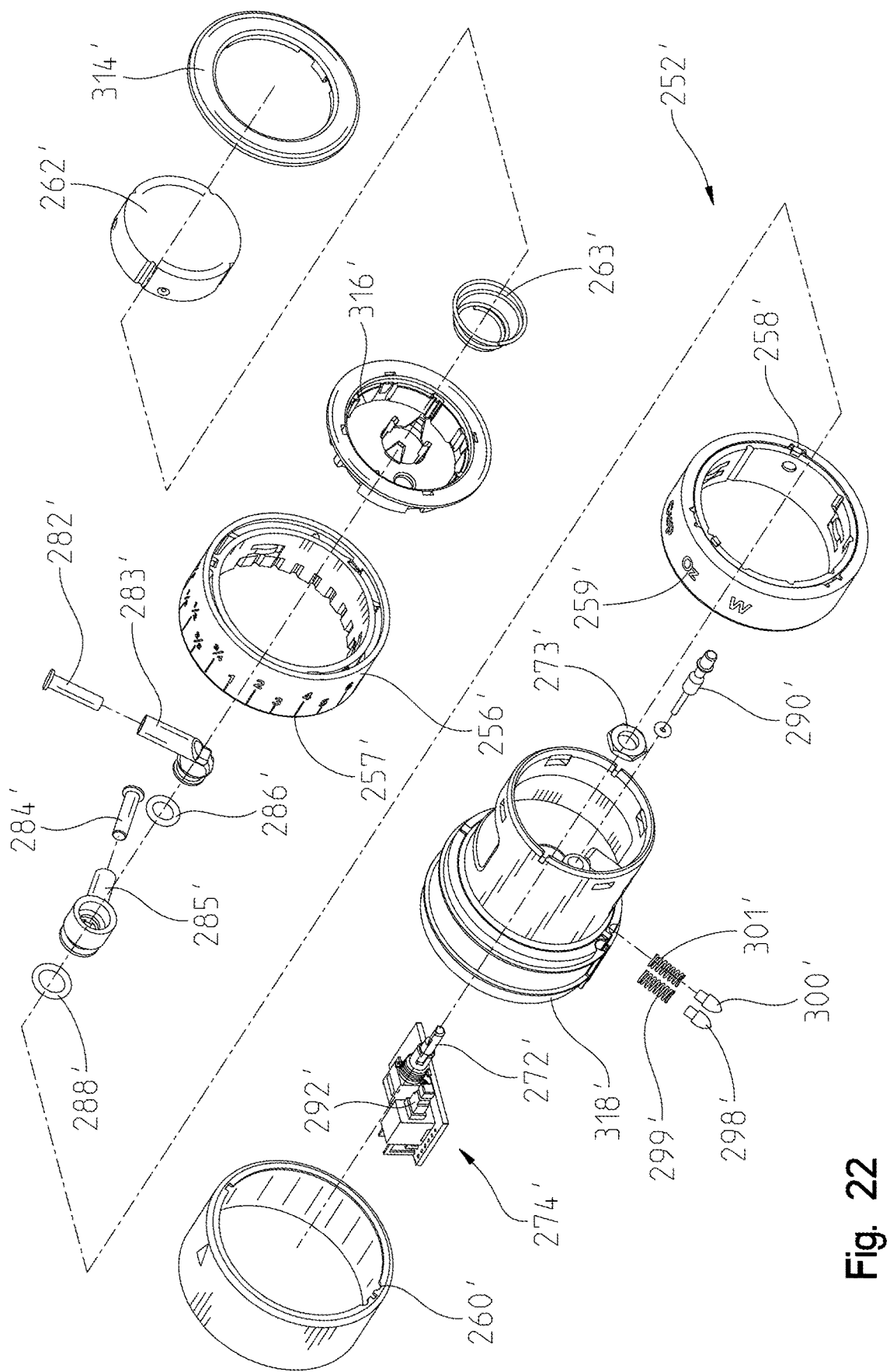
FIG. 22 is an exploded perspective view of an illustrative metered dispense input device of the metered pot filler of FIG. 18.
Figure 23:
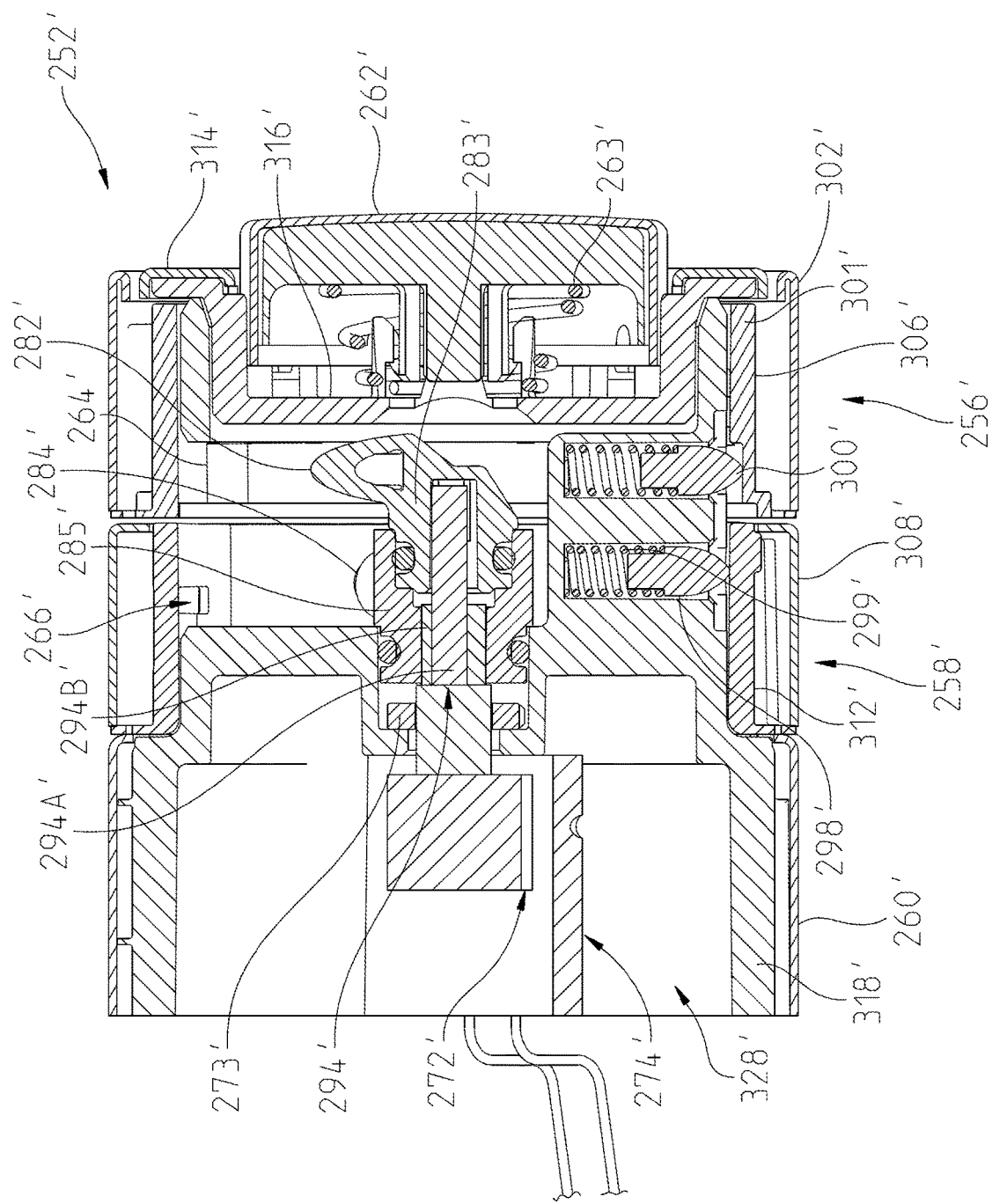
FIG. 23 is a cross-sectional view of the metered dispense input device taken along line 23-23 of FIG. 20.

FIGS. 22 and 23 illustrate the structure and pieces of metered dispense input device 252'. As mentioned above, metered dispense input device 252' is substantially the same as metered dispense input device 252. Similar structures are similarly referenced throughout. In operation, and similar to the embodiment described above, a pilot operated solenoid valve 22 is used to control the flow of water. Dials or buttons 256' 258' are used to indicate to control module 200 how much water to dispense and flow turbine 457 with magnetic sensor is used to precisely measure the amount of water (FIG. 17). In the illustrative embodiment, button 262' is used for activation to prevent dangerous accidental dispenses that could be associated with capacitive touch activation. Also, in the illustrative embodiment, button 262' has a long travel which is used to mitigate accidental activation.

Referring again to FIGS. 22 and 23, two dials 256' and 258' are illustratively used to select the amount of water to dispense. Illustratively, dial 256' is configured to select a quantity, and dial 258' is configured to select a unit. Alternatively, single dial is envisioned that could also be used to cover a range of available quantities. Dials 256' and 258' could also have labeling 257' and 259' that faces outwardly to provide indicia of quantity and units. Additionally, a grid of buttons to select quantity and units is envisioned which could also be used and provide an additional failsafe by requiring both buttons to be pushed to activate metered dispense input device 252'. In this specific embodiment, a units button and a quantity button would both have to be selected within a few seconds of each other, or control module 200 would not activate flow turbine 457. Additionally, in the illustrative embodiment metered dispense input device 252' runs on a single 9V battery, and button switch 292' allows metered dispense input device 252' to fully power off when dispensing is done, using no power until it is activated again. A touch screen could also be used for control.

In a further illustrative embodiment, dials 256' 258' are removable or separate and wirelessly connected to metered dispense pot filler 510 and the remote is run by a coin cell (or various other power supplies) and metered dispense pot filler 510 is run by a 9V battery (or various other alternative supplies including possibly an energy storage device and hydrogenator. or other energy harvesting, wireless charging, or mains powered supply).

In further illustrative embodiments, metered dispense input device 252' is connected to smart phones. Smart home devices (such as a smart microwave or stove) etc., using various protocols (Wi-Fi, zigbee, z-wave, Bluetooth, etc.). In further embodiments there is a manual input 532 in series with solenoid valve 22 that allows the user to activate/deactivate metered dispense pot filler 510 without input from metered dispense input device 252'. In further embodiments, there is a simple shut off valve in series with solenoid valve 22.

Button 262' actuates button switch 292' which activates metered dispense input device 252'. When activated, metered dispense input device 252' reads the position of quantity dial 256' and units dial 258' and opens solenoid valve 22. Metered dispense input device 252' then begins measuring the water being dispensed and shuts off solenoid valve 22 automatically when the correct amount of water is dispensed.

Some illustrative embodiments are envisioned which include a manual mode in which one dial position could simply be for "ON". This "ON" position would open solenoid valve 22 but then turn off metered dispense input device 252' and would simply dispense water without regard to measurements. This embodiment does require some form on manual input such as manual valve 534. However, manual usage and input is not required for all envisioned embodiments of the present disclosure.

It is also envisioned that one position on units dial 258' could also be customizable and a special learning mode could be used to teach what each "preset" corresponds to (1. 2. 3, 4, etc. on quantity dial 256'). In this mode the user would press button 262' to start water and then press it again to stop the water and metered dispense input device 252' would record this value for that preset. This operation could also be done through an app etc. in a connected version. In a connected version also dispense amounts could be determined by recipe/cooking apps such as any step-by-step cooking guide.

To mitigate the risk of overflow, the illustrative embodiment has a simple "ON"/"OFF" manual valve 534 in series with metered dispense input device 252' for maintenance and/or emergencies. In other words, manual valve 534 may activate and deactivate water flow through fluid outlet 530 independent of metered dispense input device 252'.

Furthermore, the illustrative metered dispense input device 252' allows pot filler 510 to only have one flow rate. More particularly, pot filler 510 including metered dispense input device 252' is configured to learn the effective flow rate (which may be affected by the local water pressure, etc.) and then use this flow rate for a fail-safe. More particularly, flow sensor 456 measures the flow rate of water delivered to fluid outlet 530. The measured flow rates of successive uses is illustratively stored in a memory of wireless control module 200 and/or valve controller 24 (FIG. 1). Wireless control module 200 and/or valve controller 24 may also include a clock or timer.

Using the average flow rate from the previous uses (the previous five flow rates, for example, with extreme outliers or very low values ignored) a processor of wireless control module 200 and/or valve controller 24 may calculate how long a given dispense should take. For example, if the requested amount is two gallons and the calculated average flow rate from the past five dispenses is four gallons per minute, then it would set a fail safe timer to shut off metered dispense pot filler 510 at forty seconds (calculated time plus ten seconds) in the case, for example, of a flow turbine assembly 457 malfunction. In case of a malfunction in solenoid valve 22 causing metered dispense pot filler 510 to continue after control module 200 signals a stop, an audible indicator 29 (e.g., a buzzer or a siren) could also be activated to alert the user to shut manual valve 534 and thereby deactivate water flow.

As shown in FIGS. 18-23, this illustrative embodiment may employ no touch-sensitive operation, and wireless control is not needed which allows battery life to be greatly improved. As described above, metered dispense input device 252' is integrated into metered dispense pot filler 510 because there is no under sink access, as is present in a conventional sink environment. Additionally, metered dispense pot filler 510 does not include a mixing valve, and in some embodiments, has no need for any manual valve, though some embodiments, such as in FIGS. 18-23 do include manual input 532.

Although the invention has been described in detail with reference to certain preferred embodiments, variations and modifications exist within the spirit and scope of the invention as described and defined in the following claims.

The invention claimed is:

1. A metered dispense pot filler mounted on a wall having a fluid supply for use in dispensing fluid into a vessel resting on a support surface, the pot filler comprising:
    a metered dispense input device;
    an electrically operable valve operably coupled to the metered dispense input device and in fluid communication with the fluid supply;
    a first arm having a first end and a second end, the first end rotatably coupled to and extending radially of the metered dispense input device;
    a second arm having a first end and a second end, the first end rotatably coupled to and extending radially of the second end of the first arm;
    a fluid outlet, in fluid communication with the fluid supply and coupled to the second end of the second arm; and
    wherein the metered dispense input device includes:
        a shell defining a chamber;
        an input controller disposed within the chamber and operably coupled with an electrically operable valve of the fluid supply;
        a rotatable first dial supported by the shell and operably coupled to the input controller;
        a rotatable second dial supported by the shell and operably coupled to the input controller; and
        an activation button positioned above the first dial and in communication with the input controller, the activation button operably coupled to the first dial and the second dial.

2. The metered dispense pot filler of claim 1, wherein the rotational position of the first dial selects one of a first plurality of values corresponding with a numerical unit.

3. The metered dispense pot filler of claim 2, wherein the rotational position of the second dial selects one of a second plurality of values corresponding with a fluid serving size.

4. The metered dispense pot filler of claim 3, wherein actuation of the activation button communicates the values selected by the first dial and the second dial to the input controller for dispensing a volume of fluid defined by the numerical measurement unit selected by the first dial and the fluid serving size selected by the second dial.

5. The metered dispense pot filler of claim 1, wherein the metered dispense input device further includes a manual valve fluidly coupled in series with the electrically operable valve, the manual valve supported by the second end of the second arm.

6. The metered dispense pot filler of claim 1, wherein the metered dispense input device further includes:
    at least one potentiometer in communication with the input controller;
    a first linkage operably coupling the first dial to the at least one potentiometer; and
    a second linkage operably coupling the second dial to the at least one potentiometer.

7. The metered dispense pot filler of claim 6, wherein the at least one potentiometer receives rotation inputs from the first dial and the second dial and communicates the rotation inputs to the input controller, the input controller including a transceiver configured to wirelessly communicate with a valve controller to control operation of the electrically operable valve of the faucet.

8. The metered dispense pot filler of claim 6, wherein when the activation button is actuated, a power supply is electrically coupled to the input controller.

9. The metered dispense pot filler of claim 1, wherein the metered dispense input device further includes at least one dial rotation sensor operably coupled with the first dial and the second dial, the at least one dial rotation sensor in communication with the input controller.

10. The metered dispense pot filler of claim 9, wherein the input controller receives rotation inputs from the first dial and the second dial via the at least one dial rotation sensor, the input controller including a transceiver configured to wirelessly communicate with a valve controller to control operation of the electrically operable valve of the metered dispense pot filler.

11. The metered dispense pot filler of claim 1, wherein the metered dispense input device further includes a power supply which is disposed within the chamber to power the metered dispense input device.

12. The metered dispense pot filler of claim 1, wherein the metered dispense input device further includes a wireless transceiver configured to transmit wireless signals to control operation of the electrically operable valve.

13. The metered dispense pot filler of claim 1, further comprising a flow sensor measuring a flow rate of water delivered to the fluid outlet, a memory operably coupled to the flow sensor for storing a plurality of measured flow rates, and a fail-safe timer based upon the plurality of measure flow rates for deactivating water flow after a predetermined time.

14. The metered dispense pot filler of claim 13, further comprising an audible indicator for sounding an alert if the flow sensor detects water flow after the predetermined time.

15. A metered dispense pot filler mounted on a wall having a fluid supply for use in dispensing fluid into a vessel resting on a support surface, the pot filler comprising:
    a metered dispense input device;
    an arm rotatably supported by the metered dispense input device; and
    a fluid outlet, in fluid communication with the fluid supply and supported by the arm;
    wherein the metered dispense input device includes:
        a shell defining a chamber;
        an input controller disposed within the chamber and configured to communicate with an electrically operable valve;
        a rotatable first dial supported by the shell and operably coupled to the input controller;
        a rotatable second dial supported by the shell and operably coupled to the input controller;
        an activation button positioned above the first dial, the activation button operably coupled to the input controller;

an electrically operable valve operably coupled to the metered dispense input device; and a control module in communication with the input controller and configured to control operation of the electrically operable valve.

16. The metered dispense pot filler of claim 15, wherein the arm includes:

a first arm having a first end and a second end, the first end rotatably coupled to and extending radially of the metered dispense input device; and a second arm having a first end and a second end, the first end rotatably coupled to and extending radially of the second end of the first arm.

17. The metered dispense pot filler of claim 15, wherein the rotational position of the first dial selects one of a first plurality of values corresponding with a numerical unit.

18. The metered dispense pot filler of claim 17, wherein the rotational position of the second dial selects one of a second plurality of values corresponding with a fluid serving size.

19. The metered dispense pot filler of claim 15, further comprising a wireless control module having a tube with a flow sensor fluidly coupled with the electrically operable valve.

20. The metered dispense pot filler of claim 19, further comprising a circuit board supporting a detector, wherein the detector is configured to receive inputs from the flow sensor corresponding to a measured flow rate and transmit the inputs to operate the electrically operable valve.

21. The metered dispense pot filler of claim 15, further comprising a temperature sensor fluidly coupled with the electrically operable valve.

22. The metered dispense pot filler of claim 15, wherein the control module is in wireless communication with the input controller.

23. The metered dispense pot filler of claim 15, further comprising a flow sensor measuring a flow rate of water at the fluid outlet, a memory operably coupled to the flow sensor for storing a plurality of measured flow rates, and a fail-safe timer based upon the plurality of measured flow rates for deactivating water flow after a predetermined time.

* * * * *